United States Patent
Rapaport

(10) Patent No.: US 10,839,151 B2
(45) Date of Patent: Nov. 17, 2020

(54) SYSTEMS AND METHODS FOR AUTOMATIC ANALYSIS OF TEXT-BASED FOOD-RECIPES

(71) Applicant: myFavorEats Ltd., Ashdod (IL)

(72) Inventor: Orly Rapaport, Tel-Aviv (IL)

(73) Assignee: myFavorEats Ltd., Ashdod (IL)

( * ) Notice: Subject to any disclaimer, the term of this patent is extended or adjusted under 35 U.S.C. 154(b) by 105 days.

(21) Appl. No.: 16/208,602

(22) Filed: Dec. 4, 2018

(65) Prior Publication Data

US 2019/0171707 A1 Jun. 6, 2019

Related U.S. Application Data

(60) Provisional application No. 62/594,576, filed on Dec. 5, 2017.

(51) Int. Cl.
| | |
|---|---|
| *G06F 40/205* | (2020.01) |
| *G06F 16/332* | (2019.01) |
| *G06F 3/0482* | (2013.01) |
| *G06F 40/151* | (2020.01) |
| *G06N 3/08* | (2006.01) |

(Continued)

(52) U.S. Cl.
CPC .......... *G06F 40/205* (2020.01); *G06F 3/0482* (2013.01); *G06F 3/04812* (2013.01); *G06F 16/337* (2019.01); *G06F 16/3329* (2019.01); *G06F 16/951* (2019.01); *G06F 40/151* (2020.01); *G06F 40/279* (2020.01); *G06N 3/08* (2013.01)

(58) Field of Classification Search
CPC .... G06F 40/205; G06F 40/279; G06F 40/151; G06F 16/3329; G06F 16/337; G06F 3/0482; G06F 3/04812; G06F 3/08; G09B 5/02

See application file for complete search history.

(56) References Cited

U.S. PATENT DOCUMENTS

| | | | |
|---|---|---|---|
| 2011/0055044 A1* | 3/2011 | Wiedl | G06Q 30/0621 705/26.5 |
| 2012/0136864 A1* | 5/2012 | Ochtel | G06Q 30/0633 707/738 |

(Continued)

*Primary Examiner* — Andrew C Flanders

(57) ABSTRACT

There is provided a method of computing an ingredient substitute(s), comprising: receiving a target food-recipe data structure, receiving a selection of ingredient(s) for substitution, accessing ingredient substitution data structure(s) each storing substitutes for one of the selected ingredient(s), computing adjusted food-recipe data structure(s) that include a predefined textual code that replaces one of the selected ingredients for substitution, computing for each of the adjusted food-recipe data structures, by a trained neural network, coordinates of a respective adjusted point within a multi-dimensional space, determining, for each of the adjusted food-recipe data structures, the value of the respective coordinates corresponding to each one of the substitute ingredient(s) corresponding to the selected ingredient for substitution, selecting, for each of the selected ingredients for substitution, substitute ingredient indication(s) from the corresponding ingredient substitution data structure according to a requirement of the value of the coordinate, and presenting the selected substitute ingredient indication(s).

14 Claims, 11 Drawing Sheets

(51) Int. Cl.
*G06F 16/951* (2019.01)
*G06F 3/0481* (2013.01)
*G06F 16/335* (2019.01)
*G06F 40/279* (2020.01)

(56) References Cited

U.S. PATENT DOCUMENTS

| | | | |
|---|---|---|---|
| 2013/0149679 A1* | 6/2013 | Tokuda | G09B 19/0092 434/127 |
| 2015/0220592 A1* | 8/2015 | Robberechts | G16H 20/60 715/810 |
| 2016/0179935 A1* | 6/2016 | Bhattacharjya | G06F 40/247 707/713 |
| 2016/0241653 A1* | 8/2016 | Ciepiel | A47J 43/046 |
| 2016/0286837 A1* | 10/2016 | Yu | A47J 36/321 |
| 2017/0220558 A1* | 8/2017 | Pinel | G06F 16/313 |
| 2017/0236068 A1* | 8/2017 | Byron | G06F 16/24578 706/11 |
| 2017/0323640 A1* | 11/2017 | Sisodia | A23L 5/10 |
| 2017/0372197 A1* | 12/2017 | Baughman | A23L 33/30 |
| 2018/0003687 A1* | 1/2018 | Minvielle | A47J 36/00 |
| 2019/0130005 A1* | 5/2019 | Byron | G06F 16/24578 |

\* cited by examiner

US 10,839,151 B2

SYSTEMS AND METHODS FOR AUTOMATIC ANALYSIS OF TEXT-BASED FOOD-RECIPES

RELATED APPLICATION

This application claims the benefit of priority under 35 USC § 119(e) of U.S. Provisional Patent Application No. 62/594,576 filed on Dec. 5, 2017. The contents of the above application are all incorporated by reference as if fully set forth herein in its entirety.

FIELD AND BACKGROUND OF THE INVENTION

The present invention, in some embodiments thereof, relates to representations of text-based food-recipes and, more specifically, but not exclusively, to system and methods for processing of text-based food recipes.

A text-based food-recipe for preparing a culinary dish may be obtained, for example, from the internet, from a cook-book, or written down when heard from another person. The person preparing the culinary dish according to the food-recipe may not be able to follow the recipe as instructed, for example, due to unavailability of one or more of the ingredients, an allergy to one or more of the ingredients, and/or a general dislike of one or more of the ingredients. Substituting other ingredients to obtain a similar resulting culinary dish is difficult, for example, to find another ingredient that produces a similar texture, similar taste, and/or that results in a similar mixture. Other ingredients may be experiments with, or a culinary expert (e.g., chef) with experience in preparing a wide range of dishes using a wide range of ingredients may be consulted. The result may still not be satisfactory.

When a food-recipe for preparing a likeable culinary dish is found by a user, a search for other similar recipes may be performed by the user. The search may be difficult, as the user may need to search through a large number of other recipes and/or try preparing many other recipes to find another similar culinary dish.

SUMMARY OF THE INVENTION

According to a first aspect, a method of computing by a computer system in communication with an ingredient-substitution dataset, with a trained neural network, and with a client terminal, via a network, a substitute for at least one ingredient in a text-based food-recipe, comprises: receiving a target text-based food-recipe including a set of text-based instructions for preparation of a certain food-recipe according to a set of text-based ingredients, converting the target text-based food-recipe to a target food-recipe data structure storing an indication of the set of text-based ingredients, and the set of text-based instructions, receiving from the client terminal via a GUI presenting the target text-based food-recipe on a display, a selection of at least one text-based ingredient of the set of text-based ingredients for substitution, accessing at least one ingredient substitution data structure each storing at least one ingredient indication that is a substitutes for one of the selected at least one text-based ingredient, computing at least one adjusted food-recipe data structures for the target food-recipe data structure, each adjusted food-recipe data structure includes a predefined textual code that replaces one of the selected text-based ingredients for substitution, computing for each of the adjusted food-recipe data structures, by the trained neural network, coordinates of a respective adjusted point within a multi-dimensional food-recipe space, determining, for each of the adjusted food-recipe data structures, the value of the coordinates of the respective adjusted point within the multi-dimensional food-recipe space corresponding to each one of the substitute ingredient indications of the ingredient substitution data structure corresponding to the selected text-based ingredient for substitution, selecting, for each of the selected text-based ingredients for substitution, at least one substitute ingredient indication from the corresponding ingredient substitution data structure according to a requirement of the value of the coordinate, and presenting within the GUI on the display of the client terminal in association with the text-based target food-recipe, for each of the selected text-based ingredients for substitution, the selected at least one substitute ingredient indication.

According to a second aspect, method of identifying at least one similar recipe for a text-based food-recipe by a computer system in communication with a trained neural network, with a food-recipe dataset, and with a client terminal, via a network, comprising: receiving from the client terminal via a GUI, a target text-based food-recipe including a text-based set of instructions for preparation of a certain food-recipe according to a text-based set of ingredients, converting the target text-based food-recipe to a target food-recipe data structure storing an indication of the set of ingredients, and the text-based instructions, receiving a plurality of sample food-recipe data structures each storing a set of ingredient indications, and text-based instructions for preparation, computing for the target food-recipe data structure, by the trained neural network, coordinates of a target point within a multi-dimensional food-recipe space, computing for each of the sample food-recipe data structures, by the trained neural network, coordinates of a respective sample point within the multi-dimensional food-recipe space, computing a statistical distance between the target point and each respective sample point, selecting at least one sample food-recipe data structure according to a requirement of the statistical distance, and providing a text-based version of the selected at least one sample food-recipe data structure for presentation within the GUI presented on the display of the client terminal.

According to a third aspect, a method of computing a classifier for classification of a text-based food-recipe by a computer system in communication with a trained neural network, and a food-recipe dataset, comprises: receiving a plurality of sample food-recipe data structures each storing a set of ingredient indications, and text-based instructions for preparation, computing for each of the sample food-recipe data structures, by the trained neural network, coordinates of a respective sample point within a multi-dimensional food-recipe space, receiving an indication of a classification type for each of the plurality of sample food-recipe data structures, and training a statistical classifier for computing a target classification type for a target food-recipe data structure according to the sample points and associated classification types.

According to a fourth aspect, a computer implemented method of generating a neural network for computation of a multi-dimensional representation of a text-based food-recipe, comprises: receiving by a computer system in communication with: a food-recipe dataset, an ingredient dataset, and an ingredient-substitution dataset: a plurality of food-recipe data structures each storing a set of ingredient indications and text of instructions for preparation, a plurality of ingredient data structures each storing values of parameters of a respective ingredient indication of the set of ingredient indications, represented as an ingredient point in a multi-dimensional ingredient space, a plurality of ingredient substitution data structures each storing at least two indications of ingredients stored by the ingredient dataset that are substitutes for at least one ingredient indication stored in at least one food-recipe data structure, and training a neural network according to the plurality of food-recipe data structures, the plurality of ingredient data structures, and the plurality of ingredient substitution data structures, wherein initial network weights of the neural network are randomly selected and adjusted according to a plurality of iterations, and comprising for each iteration: randomly selecting a certain food-recipe data structure, creating an adjusted food-recipe data-structure from the certain food-recipe data-structure by replacing a randomly selected certain ingredient indication with a predefined keyword in the set of ingredients and in the instructions of the certain food-recipe, feeding the adjusted food-recipe data-structure into the current neural network, and computing an objective loss function indicative of a statistical distance between a set of coordinates of the adjusted food-recipe data structure denoting an adjusted point within a multi-dimensional food-recipe space, and a set of coordinates of the certain food-recipe data-structure denoting a certain food-recipe point within the multi-dimensional food-recipe space, wherein the neural network is trained by computation of a set of weights for layers of the neural network according to iterative minimization of the objective loss function until a stop condition is met, wherein the trained neural network computes coordinates of a food-recipe point within a multi-dimensional food-recipe space for an input of a target text-based food-recipe received by the computer system from a client terminal over a network.

Some implementations of the systems, apparatus, methods and/or code instructions (stored in a data storage device, executable by one or more hardware processors) described herein relate to one or more of the technical problems of: automatically identifying one or more suitable ingredients for substitution in a food-recipe, identifying one or more similar recipes for a target recipe, and/or automatically classifying a target recipe. In particular, the problem is related to considering the context of the recipe, and/or the features of the recipe in their entirety. The particular solution to the technical problem described herein is based on training of a neural network that generates a multi-dimensional representation (e.g., a point represented by a set of coordinates along a set of axes of a multi-dimensional space) of a food-recipe (optionally text-based). Statistical distance(s) are computed to other points in the multi-dimensional space representing other recipes and/or variations of the target recipe. The computed statistical distance is an indicator of similarity between the recipes represented by the corresponding points.

The systems, apparatus, methods and/or code instructions (stored in a data storage device, executable by one or more hardware processors) described herein are directed to an improvement in computer-related technology, by allowing computers to compute a multi-dimensional representation of recipes considering the context of the recipe, and/or perform evaluations between recipes and/or between ingredients of recipes and/or classify the recipe into a certain type, based on the multi-dimensional representation. Such evaluations previously between recipes and/or between ingredients of recipes and/or classification of the recipe into a certain type, could only be performed by humans (mostly experts such as chefs), for example, based on emotions, instinct, and/or experience (e.g., with preparation of a wide range of recipes using a wide range of ingredients). However, it is noted that the systems, apparatus, methods and/or code instructions described herein are not merely a computer-implemented version of a mental process or intended to simply replicate or model human capability, but provide an improvement in the ability to consider very large dataset, and suggest ingredient substitutions, similar recipes, and/or classification types that would not be considered by a human (e.g., the human is not aware of the wide range of available recipes and/or ingredient substitution possibilities).

For example, a user wishes to avoid eggs in a certain quiche recipe. Although there are about 200 million recipes available online, the user is uncertain as to how to find another corresponding quiche recipe with a proper egg substitute, assuming such recipe is even available.

Some implementations of the systems, apparatus, methods, and/or code instructions (stored in a data storage device, executable by one or more hardware processors) described herein address a challenge that is particular to the internet. The internet centric technical problem is related to providing substitutes of recipes and/or identification of similar recipes and/or classification of recipes and/or other recipe queries, to one or more network connected client terminals, based on an analysis of culinary data stored in databases distributed across multiple network nodes, where the substitutes and/or similar recipes and/or classification of recipes is performed in an objective manner based on available culinary data. The selection of the substitutes and/or similar recipes and/or classification based on some implementations of the systems, apparatus, methods, and/or code instructions described herein may be performed for each client terminal accessing a server that includes a neural network trained based on a large amount of culinary data distributed across network nodes, optionally according to a customized user profile, and/or according to an objective process. In comparison, in conventional processes a human culinary expert subjectively determines the substitutes, similar recipes, classifications, and/or other recipe queries, which may vary according to the emotional state of the human, cannot be customized for different users, and/or cannot take account of the large amount of culinary data available (e.g., millions of recipes available on the internet). According to some implementations of the systems, apparatus, methods, and/or code instructions described herein, each client terminal accessing the server is provided with a similar user experience in accurately identifying substitute ingredients, similar recipes, classification of recipes, and/or other recipe queries.

The systems, apparatus, methods and/or code instructions described herein generate a new user experience, one that is different than mentally trying to find substitute ingredients, similar recipes, and/or a classification type. For example, the user may dynamically select the ingredient for substitution from a visually presented target food-recipe displayed within a GUI. All instances of the selected ingredient within the food-recipe may be dynamically adjusted within the GUI. The user may select different ingredients for substitution to quickly change the recipe. In another example, the ingredient substitution may be according to a personal preference of the user and/or allergy profile of the user.

The systems, methods, and/or code instructions described herein do not simply display information using a GUI. The systems, methods, and/or code instructions described herein may be based on a specific, structured GUI, which is paired with a prescribed functionality directly related to the GUI's structure that is addressed to and resolves the specifically identified technical problem. For example, the GUI presents the text-based food-recipe, and dynamically replaces each instance of a selected ingredient within the text-based food recipe with the substitute ingredient determined based on output of the neural network (as described herein). The GUI is designed for selection of the ingredient for substitution, for example, by hovering a pointer over the ingredient and/or clicking on the ingredient.

For example, the GUI provides a user with the ability to get a healthier version of the recipe with one or more clicks, for example, to convert a certain recipe into a gluten-free version, a low-fat version, or a high-fiber version.

In a further implementation form of the first aspect, the method further comprises receiving from the client terminal via a GUI presenting the target text-based food-recipe on a display, at least one parameter of a personal user profile, wherein each parameter of the personal user profile is associated with at least one ingredient indication, wherein the selection of at least one text-based ingredient of the set of text-based ingredients for substitution is performed according to the indication of ingredients that satisfy the personal user profile.

In a further implementation form of the first aspect, one or more parameters of the user profile are selected from the group comprising: ingredients disliked, ingredients preferred, allergies, dairy free, genetically engineered free, organic, low carb, Eatwell Apple, contains nuts, vegetarian, Kosher, gluten free, sugar free, vegan, Halal, and combinations of the aforementioned.

In a further implementation form of the first aspect, the at least one ingredient of the set of ingredients of the target food-recipe data structure is selected for substitution by at least one of clicking with a pointer, hovering a pointer over the at least one text-based ingredient, and clicking an icon associated with the at least one text-based ingredient.

In a further implementation form of the first aspect, the selected at least one text-based ingredient for substitution is automatically substituted within the GUI with the selected at least one substitute ingredient indication.

In a further implementation form of the first aspect, the requirement comprises selecting a predefined number of substitute ingredient indications according to the highest coordinate values and above a preselected floor-value.

In a further implementation form of the first, second, third, and fourth aspects, the text-based food-recipe is converted into the food-recipe data structure by parsing and formatting the text-based food-recipe, wherein the text-based set of ingredient indications are stored according to predefined identifiers, each ingredient indication of the set of ingredient indications is stored by the food-recipe data structure in association with a respective quantity of the respective ingredient of the respective text-based food-recipe, and the text-based instructions are stored as simple text.

In a further implementation form of the first, second, third, and fourth aspects, values of parameters of each ingredient indication define corresponding values of the coordinates along each of a plurality of axes of a multi-dimensional ingredient space, the parameters include at least one of: a plurality of nutritional parameters, at least one botanical parameter, and a plurality of chemical parameters.

In a further implementation form of the first, second, third, and fourth aspects, the plurality of nutritional parameters are selected from the group comprising: carbohydrate content, sugar content, saturated fat content, fiber content, omega-3 content, and alcohol content, wherein the at least one botanical parameter is selected from the group comprising: fruit, vegetable, nut, and animal part, and the plurality of chemical parameters are selected from the group comprising: texture, comparable taste, and comparable smell.

In a further implementation form of the first, second, third, and fourth aspects, the coordinates of the adjusted point within the multi-dimensional food-recipe space is computed according to values of weights of at least one hidden layer within the neural network, obtained by forward-feeding the food-recipe data structure into the trained neural network.

In a further implementation form of the first, second, third, and fourth aspects, the method further comprises encoding the target text-based food-recipe for converting into the target food-recipe data structure for feeding into an input layer of the neural network, the encoded converted target food-recipe data structure include at least one of: (i) a vector representation of a plurality of ingredients appearing in the target text-based food-recipe identified within the ingredient dataset, (ii) a vector of quantity for each of the plurality of ingredients appearing in the target text-based food-recipe, (iii) a weighted average of vectors of values of a plurality of parameters of each ingredient appearing in the target text-based food-recipe, and (iv) a vector representation of the text-based instructions of the target text-based food-recipe, and (v) a vector representation of the text-based title of the target text-based food-recipe.

In a further implementation form of the first, second, third, and fourth aspects, (i) the vector representation of the plurality of ingredients is represented within a multi-dimensional ingredient space, wherein each axes of the multi-dimensional ingredient space corresponds to one ingredient stored in the ingredient dataset, and a value along each axes denotes the presence or absence of the corresponding ingredient in the target text-based food-recipe, (ii) the vector of quantity for each of the plurality of ingredients is represented by a value along an axis indicative of quantity of each respective ingredient in the target text-based food-recipe, (iii) the values of the plural of parameters are indicative of coordinates along each of a plurality of axes of a multi-dimensional ingredient space, each axis denoting one parameter of the plurality of parameters, (iv) the vector representation of the text-based instructions is computed according to at least one of: a bag-of-words representation computed based on term frequency-inverse document frequency (tf-idf), and a latent semantic sentence representation encoded by standard language based neural network output, and (v) the vector representation of the text-based title is computed according to at least one of: a bag-of-words representation computed based on term frequency-inverse document frequency (tf-idf), and a latent semantic sentence representation encoded by standard language based neural network output.

In a further implementation form of the second aspect, the method further comprises receiving from the client terminal via the GUI, a selection of at least one ingredient for substitution appearing within the set of ingredients of the target food-recipe data structure, receiving by the computer system in communication with an ingredient-substitution dataset, a plurality of ingredient substitution data structures each corresponding to one of the selected at least one ingredient, each ingredient substitution data structure storing at least two ingredients that are substitutes for each other, identifying, within the selected at least one sample food-recipe data structure, at least one certain ingredient stored in the ingredient substitution data structure storing one of the selected ingredients, and providing an indication of substitution of the selected at least one ingredient with the at least one certain ingredient, for the target food-recipe data structure.

In a further implementation form of the second aspect, the requirement of the statistical distance is a preselected value indicative of a minimum similarity between the target food-recipe and each of the selected sample food-recipes.

In a further implementation form of the second aspect, the coordinates are based on weights of hidden layers of the trained neural network.

In a further implementation form of the second aspect, the method further comprises receiving at least one similarity parameter, wherein the requirement of the statistical distance is based on the similarity parameter, wherein axes of the multi-dimensional food-recipe space corresponding to the at least one similarity parameter are assigned weights significantly higher than other axes, such that at least one sample food-recipe data structure is selected according to the shortest statistical distance between the target point and respective sample points along the axes of the at least one similarity parameter.

In a further implementation form of the second aspect, the at least one similarity parameter includes at least one of: taste, and texture.

In a further implementation form of the third aspect, the method further comprises receiving a plurality of ingredient substitution data structures stored in an ingredient substitution dataset, each corresponding to one of the set of ingredients, each ingredient substitution data structure storing at least two ingredients that are substitutes for each other, for each at least one sample food-recipe data structure: receiving a selection of at least one ingredient for substitution appearing within the set of ingredients of the target food-recipe data structure, receiving the indication of the classification type including a score indicative of appropriateness of substituting the selected at least one ingredient with at least one certain ingredient stored in the ingredient substitution data structure storing one of the selected ingredients, wherein the statistical classifier is trained for computing an appropriateness score for substituting a target ingredient with another ingredient for the target food-recipe data structure according to the sample points, score indicative of appropriateness of substitution, the selected at least one ingredient, and the at least one certain ingredient.

In a further implementation form of the third aspect, the classification type is selected from the group comprising: type of ethnic food, country of origin of the food, quick to prepare food, gourmet food, and categorical name of the food.

In a further implementation form of the fourth aspect, an input layer of the trained neural network is followed by at least one hidden layer, wherein each at least one hidden layer is of a dimension determined by a predefined parameter, each at least one hidden layer is connected to adjacent layers by full connectivity, wherein a variable weight is assigned on the connection of each coordinate in each certain hidden layer, to each coordinate in the layer above and the layer below each certain layer, wherein a top hidden layer is connected to an output layer, wherein the output layer includes a single coordinate for each possible ingredient stored by the ingredient dataset, wherein the output layer is connected to the topmost hidden layer by full connectivity.

In a further implementation form of the fourth aspect, at least one of the plurality of ingredient-substitution data structures is computed based on an analysis of data collected by crawling code that automatically crawls food-based content stored on network connected nodes.

In a further implementation form of the fourth aspect, the neural network is trained based on stochastic gradient descent on a distribution of a randomly selected plurality of food-recipe data structures from the food-recipe dataset.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
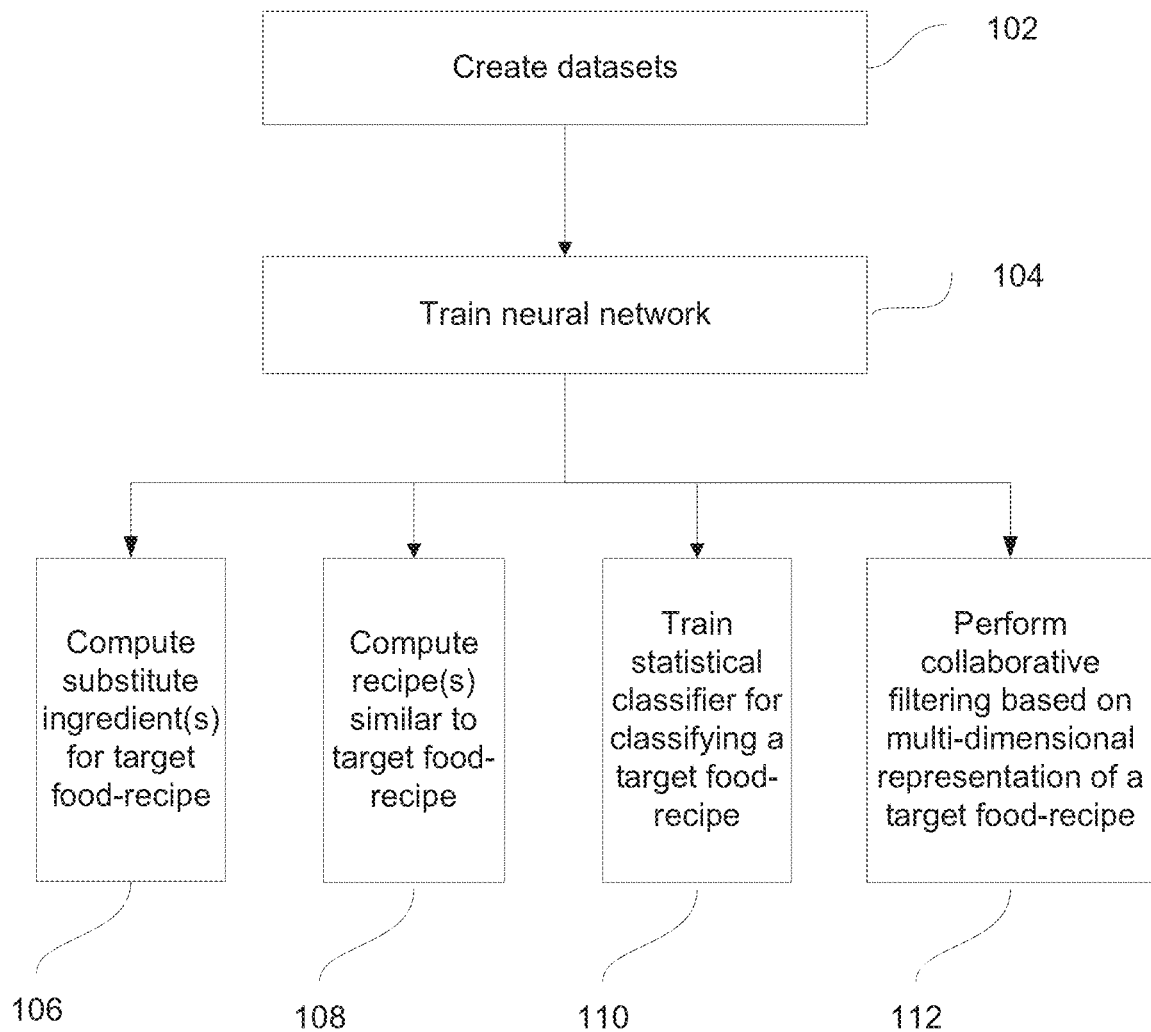
FIG. 1 is a flowchart of a method of training a neural network for computation of a multi-dimensional representation of a text-based food-recipe, and one or more processes based on the neural network computation, in accordance with some embodiments of the present invention.

The present invention, in some embodiments thereof, relates to text-based representations of food-recipes and, more specifically, but not exclusively, to system and methods for processing of text-based food recipes.

An aspect of some embodiments of the present invention relates to systems, methods, an apparatus, and/or code instructions (stored in a data storage device, executable by one or more hardware processors) for generating a trained neural network for computation of a multi-dimensional representation of a text-based food-recipe and/or foods and/or ingredients. Optionally, the multi-dimensional representation includes a set of coordinates along multiple axes, denoting a point within a multi-dimensional space. The multi-dimensional representation may be obtained by values (e.g., weights) of one or more hidden (i.e., intermediate) and/or output (i.e., last) layers of the trained neural network when the text-based food-recipe is fed into the input layer of the trained neural network (after formatting the text-based food-recipe into the food-recipe data structure as described herein).

The text-based food-recipe and/or foods and/or ingredients may be represented as text (i.e., letters, number, and/or symbols) and/or convertible into a text format in English and/or other languages. The text format may be read and understood by a human. It is noted that the text-based food-recipe and/or foods and/or ingredients may be stored in a non-text format (e.g., encoded) which is convertible into text format (e.g., for presentation on a display).

As used herein, the set of coordinates of the point within the multi-dimensional space is described to help the reader understand the conceptual basis of the output of the neural network, and/or computation of a statistical distance within the multi-dimensional space (e.g., to identify similar food-recipes and/or suitable substitution ingredients). It is to be understood that other multi-dimensional representations are possible, for example, a set of values which is not necessarily mapped to a point within the multi-dimensional space.

The multi-dimensional representation may support computation of texture and/or flavor related functions of a recipe, without the need to explicitly engineer the texture and/or flavor concepts in a computer program. For example, as described herein, other recipes with a texture and/or flavor similar to the target recipe may be identified, and/or substitute ingredients with similar texture and/or flavor may be identified.

The systems, methods, apparatus, and/or code instructions described herein are based on a computed multi-dimensional representation of text-based food-recipes and/or food ingredients, which are define aspects which are not explicitly written in the text based recipe, such as taste, texture, interaction between the ingredients and the like. The representation enables applications which otherwise would not have been enabled by using the existing text based food recipe, since such applications are based on understanding the recipes, for example, like a chef understands a text based recipe intuitively. Conceptually speaking, the systems, methods, apparatus, and/or code instructions described herein mimic the intuitive thinking of a chef, but extend capabilities that a human chef cannot perform, for example, searching through large databases for identifying similarities that a human would not consider and/or would otherwise not realize and/or cannot process using pencil and paper. In another example, applications are able to make use of information which is not explicitly written in the current existing text recipes. Examples: What is the taste of this recipe? Find a recipe with a similar texture or taste, understand the role of each ingredient in the recipe and/or the interaction between the ingredients.

The text-based food-recipe is formatted into a food-recipe data structure that includes a set of ingredients and instructions for preparation. Each ingredient of the set of ingredients is mapped to values of multiple parameters. Each ingredient may be represented as a set of coordinates along multiple axes, where each axis represents one of the parameters, denoting an ingredient point within a multi-dimensional ingredient space. The neural network is trained according to the multi-dimensional representation of the set of ingredients within the ingredient space.

Optionally, the neural network is trained according to at least one substitute ingredient suitable for substitution of at least one ingredient of the food-recipe data structure. The suitability of substation of the ingredients may be pre-defined, for example, a set of ingredients that may be substituted for one another is stored in an ingredient-substitution dataset. Training the neural network according to the substitute ingredient(s) enables the neural network to identify suitable substitutes for ingredients of the food-recipe data structure, and/or to identify similar food-recipes by consideration of corresponding substitute ingredients, and/or to classify food-recipes by consideration of corresponding substitute ingredients.

An aspect of some embodiments of the present invention relates to systems, methods, an apparatus, and/or code instructions (stored in a data storage device, executable by one or more hardware processors) for identifying at least one substitute ingredient for substitution within a target text-based food-recipe by the trained neural network. The text-based food-recipe is converted into the target food-recipe data structure as described herein. The substitute ingredient(s) are identified by computing an adjusted food-recipe data structure that includes the target food-recipe data structure with a text-code (e.g. UNKNOWN) replacing the ingredients selected for substitution. The trained neural network computes a set of coordinates within a multi-dimensional space for the adjusted food-recipe data structure, as described herein. The value of each coordinate (e.g., along the axis) corresponding to each possible ingredient substitute indication (as stored by the substitute ingredient data set) is evaluated according to a requirement, for example, the substitute ingredients with the highest value are selected. For example, the top 1, 2, or 3 substitutes are selected. The requirement may include a lower floor limit. Substitute ingredients with value below the flood are ignored, for example, to avoid inappropriate substitutions. The substitute ingredient may be presented with the GUI presenting the target text-based food recipe, for example, automatically replacing each instance of the selected ingredient for substitution. The neural network enables identification of substitute ingredients by consideration of the recipe as a whole, and/or the context of the recipe, since for example, not every ingredient substitute is suitable for every recipe. Different recipes having different contexts may require a different suitable substitute ingredient.

An aspect of some embodiments of the present invention relates to systems, methods, an apparatus, and/or code instructions (stored in a data storage device, executable by one or more hardware processors) for identifying at least one similar food-recipe data structure for a target text-based food-recipe by the trained neural network. The similar food-recipe data structure(s) (e.g., stored in a food-recipe data structure dataset) that differ from the target food-recipe data structure (derived from the target text-based food-recipe) is identified by computing the statistical distance from a point in a multi-dimensional space representing the target food-recipe data structure to other point(s) in the multi-dimensional space representing the other food-recipe data structures. For example, a certain food-recipe data structure with the closest statistical distance to the target food-recipe data structure is identified as most similar. The neural network enables identification of similar food-recipes to the target recipe by consideration of the recipe as a whole, and/or the context of the recipe.

Optionally, similar food-recipes are selected according to one or more similarity parameters (which are provided, for example, manually entered by the user, and/or obtained from the user profile). Exemplary similarity parameters include taste and/or texture. The similarity parameters are based on one or more axes of the multi-dimensional space. The food-recipe(s) data structures with the closest statistical distance to the target food-recipe data structure along one or more axes corresponding to the similarity parameters are identified as most similar in terms of the selected similarity parameters. For example, the axes of the multi-dimensional space corresponding to the similarity parameters are assigned weights with significantly higher values than other axes in terms of computation of the closest statistical distance.

An aspect of some embodiments of the present invention relates to systems, methods, an apparatus, and/or code instructions (stored in a data storage device, executable by one or more hardware processors) for computing a trained statistical classifier that computes a classification type of a target food-recipe data structure representation of a text-based food-recipe. The classifier is trained based on a set of coordinates of points within a multi-dimensional space, each point representing a respective sample food-recipe data structure, the value of the coordinates of each point are computed by the trained neural network. Each set of coordinates of the respective point is associated with an indication (e.g., tag, metadata) of a certain classification type.

Some implementations of the systems, apparatus, methods and/or code instructions (stored in a data storage device, executable by one or more hardware processors) described herein relate to one or more of the technical problems of: automatically identifying one or more suitable ingredients for substitution in a food-recipe, identifying one or more similar recipes for a target recipe, and/or automatically classifying a target recipe. In particular, the problem is related to considering the context of the recipe, and/or the features of the recipe in their entirety. Moreover, the problem is related to an automated method for allowing any user (i.e., users that are not culinary experts) to identify similar ingredients, similar recipes, and/or automatically classify recipes, without developing a culinary background and/or without experimenting and/or trying out the other ingredients and/or recipes. The particular solution to the technical problem described herein is based on training of a neural network that generates a multi-dimensional representation (e.g., a point represented by a set of coordinates along a set of axes of a multi-dimensional space) of a food-recipe (optionally text-based). Statistical distance(s) are computed to other points in the multi-dimensional space representing other recipes and/or variations of the target recipe. The computed statistical distance is an indicator of similarity between the recipes represented by the corresponding points.

The systems, apparatus, methods and/or code instructions (stored in a data storage device, executable by one or more hardware processors) described herein are directed to an improvement in computer-related technology, by allowing computers to compute a multi-dimensional representation of recipes considering the context of the recipe, and/or perform evaluations between recipes and/or between ingredients of recipes and/or classify the recipe into a certain type, based on the multi-dimensional representation. Such evaluations previously between recipes and/or between ingredients of recipes and/or classification of the recipe into a certain type, could only be performed by humans (mostly experts such as chefs), for example, based on emotions, instinct, and/or experience (e.g., with preparation of a wide range of recipes using a wide range of ingredients). However, it is noted that the systems, apparatus, methods and/or code instructions described herein are not merely a computer-implemented version of a mental process or intended to simply replicate or model human capability, but provide an improvement in the ability to consider very large dataset, and suggest ingredient substitutions, similar recipes, and/or classification types that would not be considered by a human (e.g., the human is not aware of the wide range of available recipes and/or ingredient substitution possibilities).

For example, a user wishes to avoid eggs in a certain quiche recipe. Although there are about 200 million recipes available online, the user is uncertain as to how to find another corresponding quiche recipe with a proper egg substitute, assuming such recipe is even available.

Some implementations of the systems, apparatus, methods, and/or code instructions (stored in a data storage device, executable by one or more hardware processors) described herein address a challenge that is particular to the internet. The internet centric technical problem is related to providing substitutes of recipes and/or identification of similar recipes and/or classification of recipes and/or other recipe queries, to one or more network connected client terminals, based on an analysis of culinary data stored in databases distributed across multiple network nodes, where the substitutes and/or similar recipes and/or classification of recipes is performed in an objective manner based on available culinary data. The selection of the substitutes and/or similar recipes and/or classification based on some implementations of the systems, apparatus, methods, and/or code instructions described herein may be performed for each client terminal accessing a server that includes a neural network trained based on a large amount of culinary data distributed across network nodes, optionally according to a customized user profile, and/or according to an objective process. In comparison, in conventional processes a human culinary expert subjectively determines the substitutes, similar recipes, classifications, and/or other recipe queries, which may vary according to the emotional state of the human, cannot be customized for different users, and/or cannot take account of the large amount of culinary data available (e.g., millions of recipes available on the internet). According to some implementations of the systems, apparatus, methods, and/or code instructions described herein, each client terminal accessing the server is provided with a similar user experience in accurately identifying substitute ingredients, similar recipes, classification of recipes, and/or other recipe queries.

The systems, apparatus, methods and/or code instructions described herein generate a new user experience, one that is different than mentally trying to find substitute ingredients, similar recipes, and/or a classification type. For example, the user may dynamically select the ingredient for substitution from a visually presented target food-recipe displayed within a GUI. All instances of the selected ingredient within the food-recipe may be dynamically adjusted within the GUI. The user may select different ingredients for substitution to quickly change the recipe. In another example, the ingredient substitution may be according to a personal preference of the user and/or allergy profile of the user.

The systems, methods, and/or code instructions described herein do not simply display information using a GUI. The systems, methods, and/or code instructions described herein may be based on a specific, structured GUI, which is paired with a prescribed functionality directly related to the GUI's structure that is addressed to and resolves the specifically identified technical problem. For example, the GUI presents the text-based food-recipe, and dynamically replaces each instance of a selected ingredient within the text-based food recipe with the substitute ingredient determined based on output of the neural network (as described herein). The GUI is designed for selection of the ingredient for substitution, for example, by hovering a pointer over the ingredient and/or clicking on the ingredient.

For example, the GUI provides a user with the ability to get a healthier version of the recipe with one or more clicks, for example, to convert a certain recipe into a gluten-free version, a low-fat version, or a high-fiber version.

The systems, apparatus, methods and/or code instructions (storage in a data storage device, executable by one or more hardware processors) described herein improve an underlying technical process within the technical field of neural networks.

Some implementations of the systems, apparatus, methods and/or code instructions (stored in a data storage device, executable by one or more hardware processors) described herein automatically generate new data in the form of the trained neural network for computation of the multi-dimensional representation of a target food-recipe, optionally a set of coordinates of a point in a multi-dimensional space, where the point is indicative of the target recipe.

The systems, apparatus, methods and/or code instructions (stored in a data storage device, executable by one or more hardware processors) described herein are tied to physical real-life components, for example, a physical display, a hardware processor(s) that executes code instructions stored on a physical memory storage device, and/or a physical network.

The systems, apparatus, methods and/or code instructions (stored in a data storage device, executable by one or more hardware processors) described herein provide a unique, particular, and advanced technique of evaluating between text-based food-recipes and/or ingredients thereof, based on a unique, particular, and advanced technique of computing a multi-dimensional representation of a text-based food-recipe.

Accordingly, the systems and/or methods described herein are inextricably tied to computer technology.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term recipe may be substituted for the term food-recipe, and relates to food and/or other culinary products (i.e., human edible).

As used herein, the term food-recipe sometimes refers to food-recipe data structure which is a data structure representation of the text-based food-recipe formatted for processing by the trained neural network, and/or for training of the neural network.

As used herein, the term ingredient sometimes refers to an ingredient indication, for example, the indication of the ingredient is stored in the food-recipe data structure.

Figure 2:
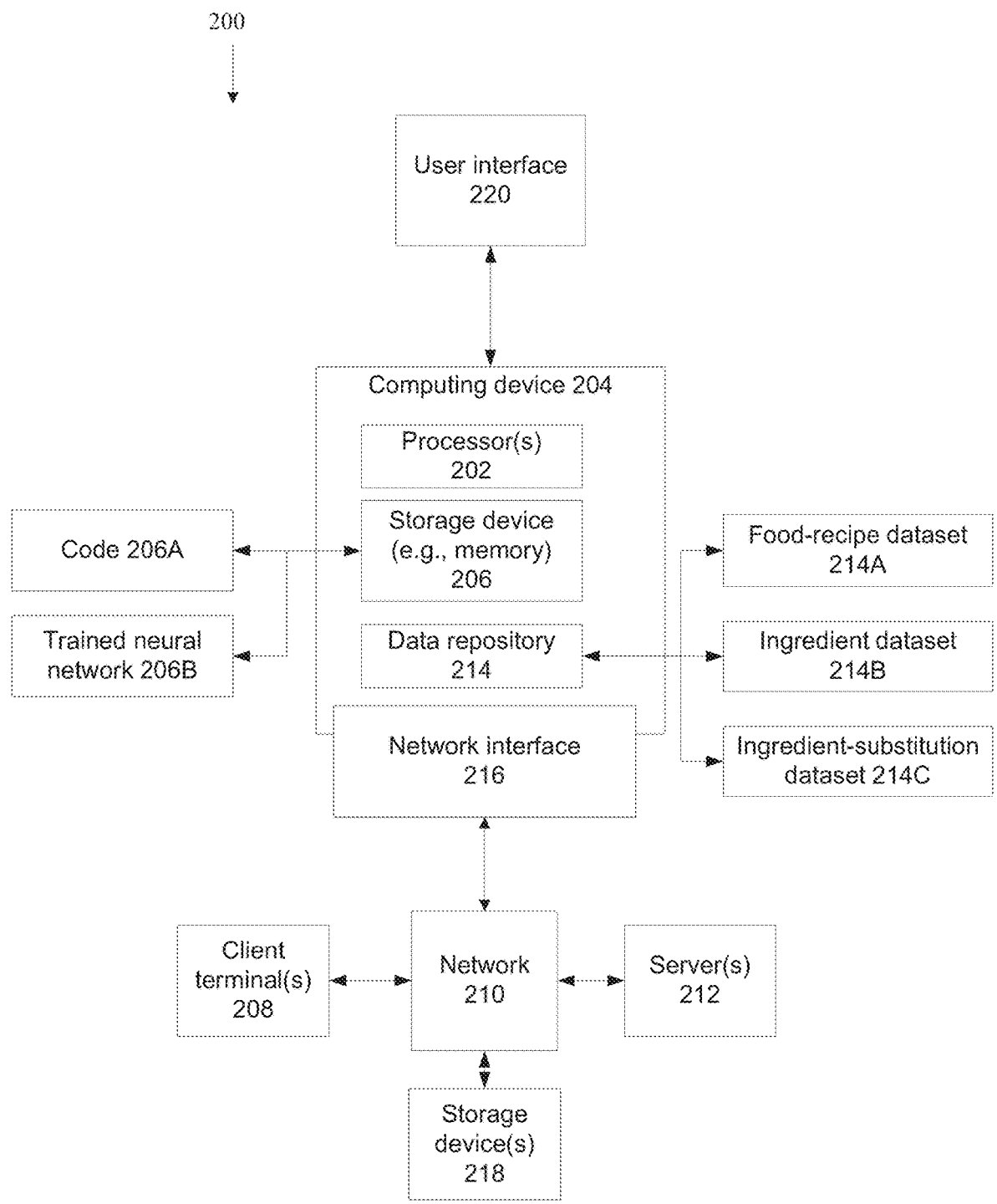
FIG. 2 is a block diagram of components of a system for training the neural network for computation of the multi-dimensional representation of a text-based food-recipe and/or for executing one or more code instructions based on the neural network computations, in accordance with some embodiments of the present invention.
Figure 3:
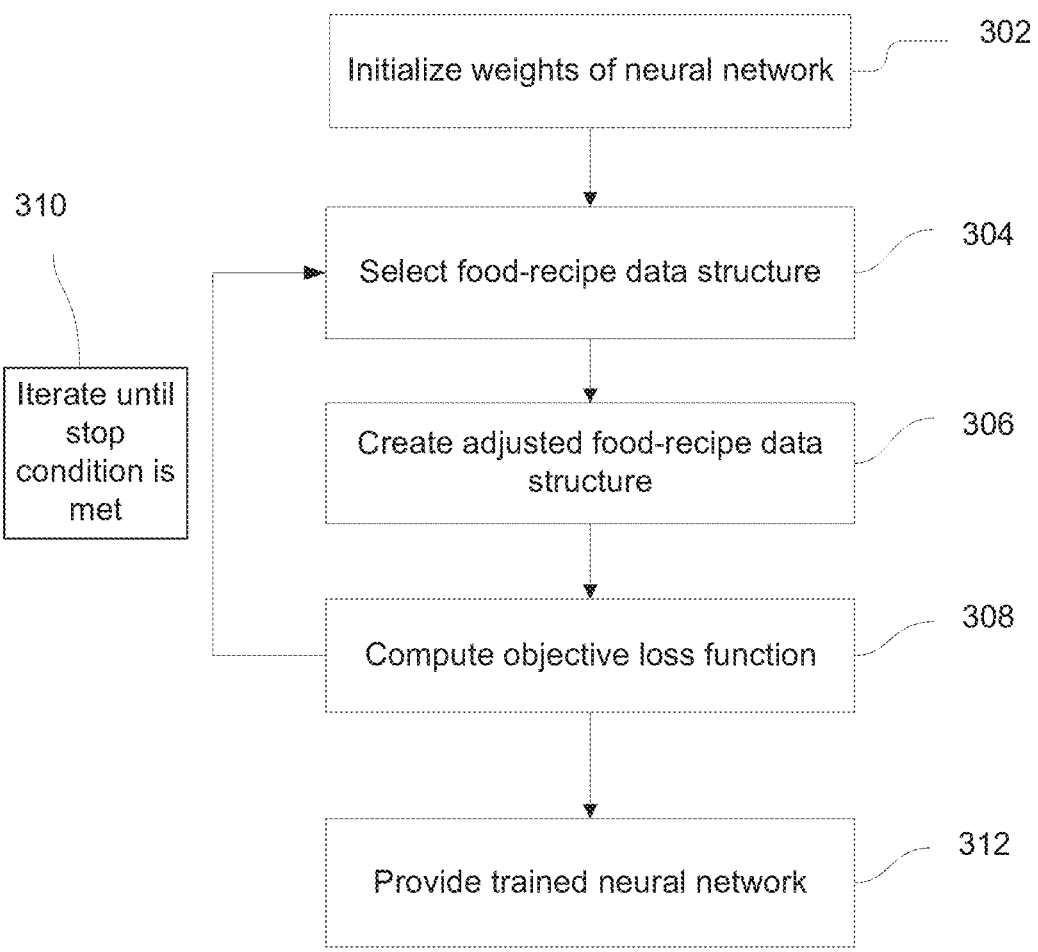
FIG. 3 is a flowchart of an exemplary implementation for training the neural network, in accordance with some embodiments of the present invention.
Figure 4:
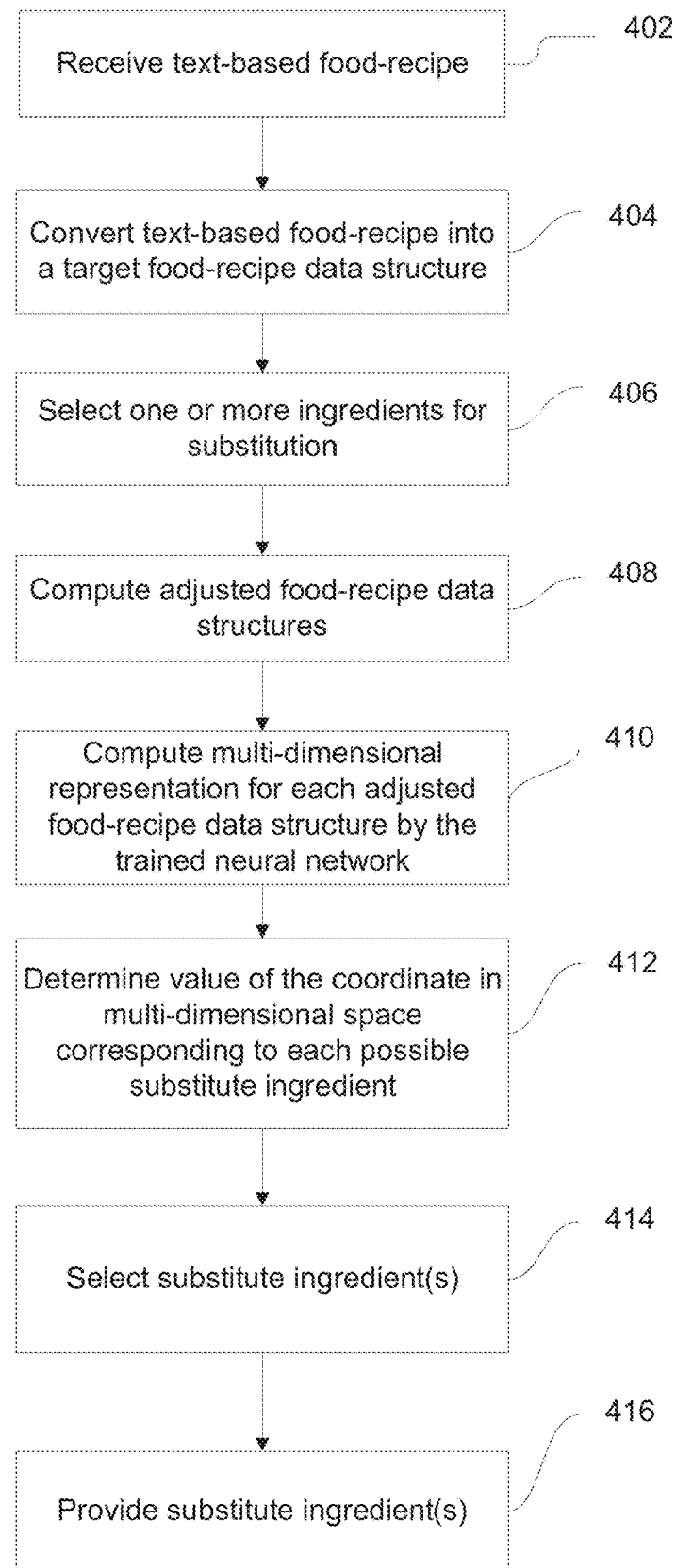
FIG. 4 is a is a flowchart of an exemplary method of computing a substitute for one or more ingredients in a text-based food-recipe by the trained neural network, in accordance with some embodiments of the present invention.
Figure 5:
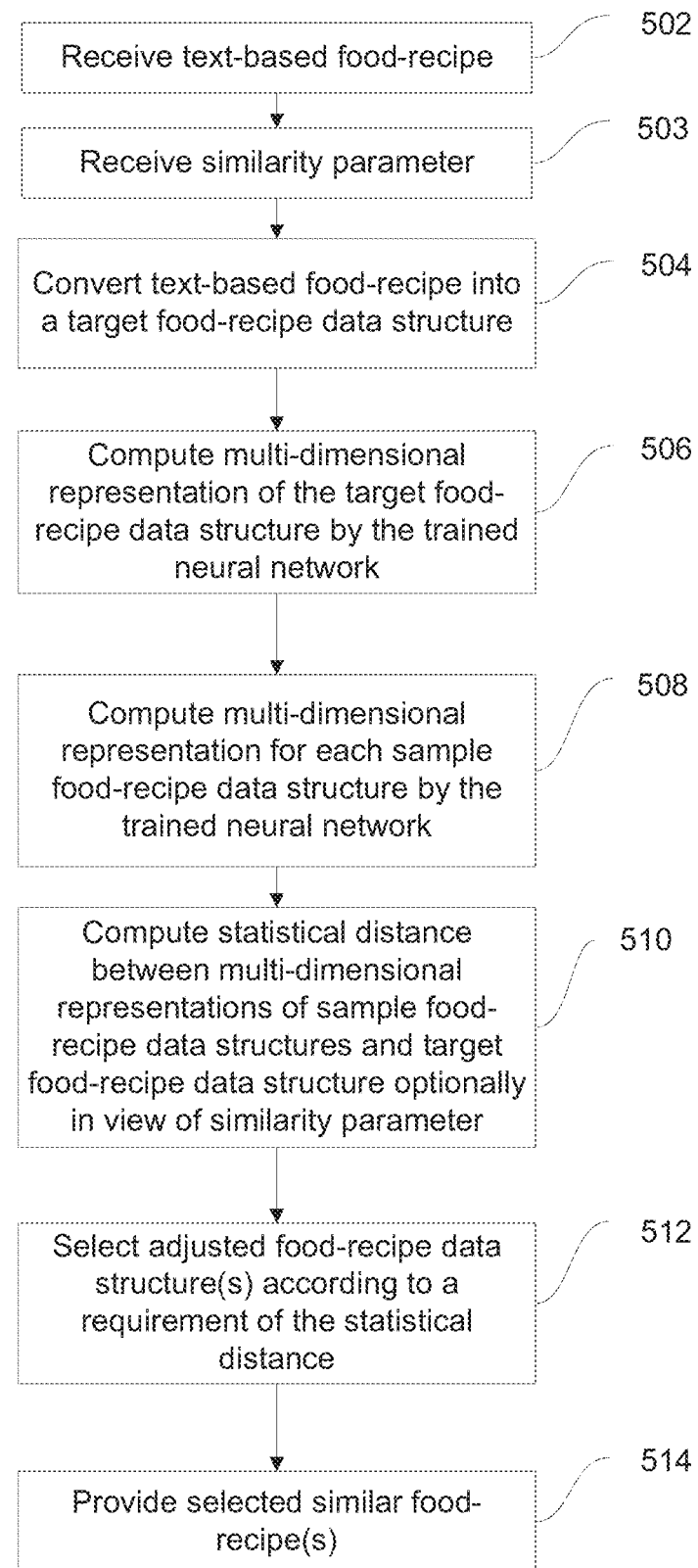
FIG. 5 is a flowchart of an exemplary method of identifying at least one similar recipe for a text-based food-recipe by a trained neural network, in accordance with some embodiments of the present invention.
Figure 6:
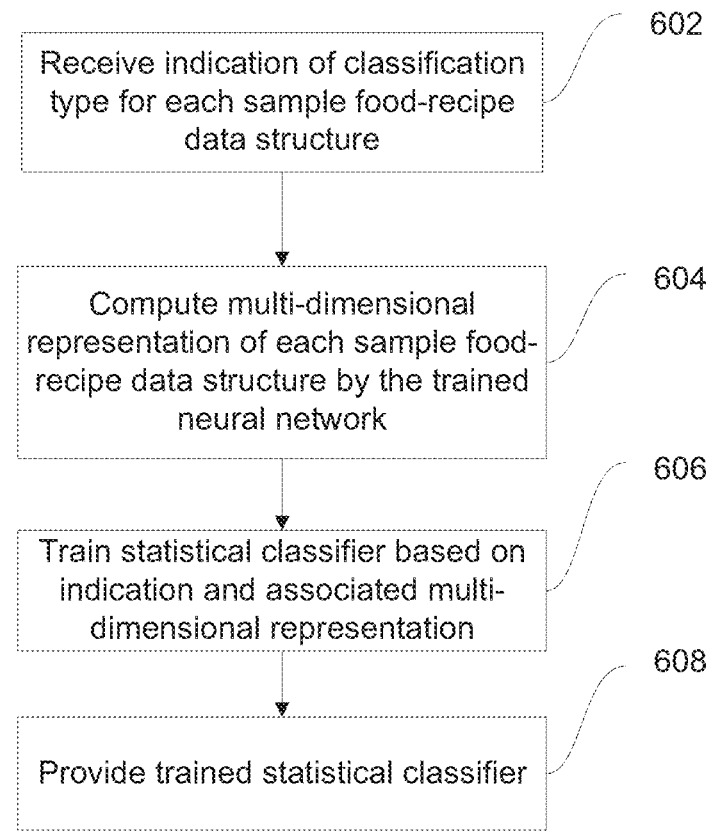
FIG. 6 is a flowchart of an exemplary method of computing a classifier for classification of a text-based food-recipe based on output of the neural network, on accordance with some embodiments of the present invention.

Reference is now made to FIG. 1, which is a flowchart of a method of training a neural network for computation of a multi-dimensional representation of a text-based food-recipe, and one or more processes based on the neural network computation, in accordance with some embodiments of the present invention. Reference is also made to FIG. 2, which is a block diagram of components of a system 200 for training the neural network for computation of the multi-dimensional representation of a text-based food-recipe and/or for executing one or more code instructions based on the neural network computations, in accordance with some embodiments of the present invention. System 200 may implement the acts of the method described with reference to FIG. 1, by processor(s) 202 of a computing device 204 executing code instructions stored in a storage device 206 (also referred to as a program store). Reference is also made to FIG. 3, which is a flowchart of a method of training the neural network, in accordance with some embodiments of the present invention. Reference is also made to FIG. 4, which is a flowchart of a method of computing a substitute for one or more ingredients in a text-based food-recipe, based on the computations of the trained neural network, in accordance with some embodiments of the present invention. Reference is also made to FIG. 5, which is a flowchart of a method of identifying at least one similar recipe for a text-based food-recipe, based on the computations of the trained neural network, in accordance with some embodiments of the present invention. Reference is also made to FIG. 6, which is a flowchart of a method of an exemplary method of computing a classifier for classification of a text-based food-recipe based, based on the computations of the trained neural network, in accordance with some embodiments of the present invention. System 200 may implement the acts of the methods described with reference to FIGS. 3-6, by processor(s) 202 of computing device 204 executing code 206A stored in storage device 206 (also referred to as a program store). Computing device 204 may be implemented as, for example, a client terminal, a server, a computing cloud, a virtual machine, a mobile device, a desktop computer, a thin client, a Smartphone, a Tablet computer, a laptop computer, a wearable computer, glasses computer, and a watch computer. Computing device 204 may be embedded and/or connected with kitchen appliances, for example, ovens, pantries, fridges, and/or internet of things (IoT) cooking devices.

Multiple architectures of system 200 based on computing device 204 may be implemented. For example, computing device 204 may be implemented as a standalone device (e.g., kiosk, client terminal, smartphone) that include locally stored code instructions that implement one or more of the acts described with reference to FIGS. 1, and/or 3-6, for training of the neural network and/or performing computations based on the trained neural network. In another exemplary implementation, computing device 204 executing stored code instructions, may be implemented as one or more servers (e.g., network server, web server, a computing cloud, a virtual server) that provides services (e.g., one or more of the acts described with reference to FIGS. 1 and/or 3-6) to one or more client terminals 208 over a network 210. For example, the training of the neural network may be performed by computing device 204, as described with reference to FIG. 3. The features that are computed based on the trained neural network, as described with reference to FIGS. 4-6, are provided as services by computing device 204 to client terminals 208 over network 210. The services may be provided by computing device 204 to client terminals 208 over network 210, for example, providing software as a service (SaaS) to the client terminal(s) 208, providing software services accessible using a software interface (e.g., application programming interface (API), software development king (SDK)), providing an application for local download to the client terminal(s) 208, providing an add-on to a web browser running on client terminal(s) 208, and/or providing functions using a remote access session to the client terminals 208, such as through a web browser executed by client terminal 208 accessing a web sited hosted by computing device 204.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIGS. 1 and/or 3-6 when executed by processor(s) 202.

Computing device 204 may include a data repository 214 for storing data, for example, food-recipe dataset 214A, ingredient dataset 214B, and/or ingredient-substitution dataset 214C. Data repository 214 may be implemented as, for example, a memory, a local hard-drive, virtual storage, a removable storage unit, an optical disk, a storage device, and/or as a remote server and/or computing cloud (e.g., accessed using a network connection).

Network 210 may be implemented as, for example, the internet, a local area network, a wireless network, a cellular network, a local bus, a point to point link (e.g., wired), and/or combinations of the aforementioned.

Computing device 204 may include a network interface 216 for connecting to network 210, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 204 may connect using network 210 (or another communication channel, such as through a direct link (e.g., cable, wireless) and/or indirect link (e.g., via an intermediary computing unit such as a server, and/or via a storage device) with one or more of:

Remote server(s) 212 and/or storage devices 218 to access updated data, to retrieve updated data, and/or obtain additional data, and/or mine for new data.

Client terminal(s) 208, when computing device 204 is implemented as a server remotely providing the features and/or acts described with reference to FIGS. 1 and/or 3-6.

Computing device 204 and/or client terminal(s) 208 include and/or are in communication with one or more physical user interfaces 220 that include a mechanism for a user to enter data (e.g., providing an indication of the food-recipe, and/or selection of one or more ingredients for substitution, as described herein) and/or view the displayed results, optionally within a GUI. Exemplary user interfaces 220 include, for example, one or more of, a touchscreen, a display, a keyboard, a mouse, and voice activated software using speakers and microphone.

At 102, one or more datasets 214A-C (e.g., stored as databases, and/or a cluster of records) are accessed and/or created. Databases 214A-C may be stored locally by data repository 214 of computing device 204, and/or stored remotely by server(s) 212 and/or storage device(s) 218 (accessed via network 210).

At least some of the data stored in one or more of datasets 214A-C may be manually entered by a user. As used herein, the phrase manually entered may refer to culinary expert knowledge. It is noted that culinary expert knowledge may alternatively or additionally be automatically collected by code (e.g., retrieved from culinary databases and/or culinary web sites) for automatic population of at least some of the data stored in one or more datasets 214A-C. At least some of the data stored in one or more datasets 214A-C may represent semantic and/or culinary information.

Food-recipe dataset 214A stores a representation for each of multiple food-recipes. Each text-based food-recipe is converted into a representation of a food-recipe data structures. Optionally, each food-recipe data structure stores a set of ingredients included in the respective food-recipe, and instructions for preparation of the respective food-recipe. Each member of the set of ingredients may be stored as an identifier, link, pointer, code, and/or the text name of the ingredient, corresponding to an ingredient stored in ingredient dataset 214B.

Dataset 214A may store representations of a large number of recipes, for example, at least about 1000, or 10000, or 100000, or 1000000, or 10000000, or other values.

Each food-recipe data structure is created from a text-based food-recipe. The text-based food-recipe is stored as text words and/or symbols. The text-based food-recipe may be obtained, for example, manually entered by the user (e.g., types, spoken into a microphone and converted into text), obtained from a database of recipes (e.g., stored on a network server), and/or computed from images of a cookbook (e.g., optical character recognition). The food-recipe data structure may be created by parsing and/or formatting the text-based food-recipe.

Optionally, each ingredient of the set of ingredients of each food-recipe data structure is stored in association with a respective quantity.

Optionally, the instructions of each food-recipe data structure are stored as a sequence of steps. Optionally, the instructions of each food-recipe data structure are stored as simple text.

Optionally, each food-recipe data structure stores a title of the text-based food recipe. When on title is available, an empty string indication may be stored.

In terms of mathematical representation, dataset 214A is denoted R. Each food-recipe data structure stored in R is denoted r. The set of ingredients stored in association with each r is denoted $L(r)$. The instructions stored in association with each r is denoted $I(r)$. The title stored in association with each r is denoted $T(r)$.

Ingredient dataset 214B stores representation of ingredients. Each ingredient may be included in at least one of the food-recipes stored by the food-recipe dataset 214A. Each ingredient may be stored as values of parameters, optionally as coordinates of an ingredient point in a multi-dimensional ingredient space. Values of parameters of the respective ingredient define corresponding values along each axes of the multi-dimensional space corresponding to one of the parameters.

The value of the parameters for each ingredient may be obtained, for example, by a user manually entering the values, by code instructions that compute the values from data (e.g., obtained by mining datasets over a network), and/or by code instructions that crawl the network to identify data sources storing the value.

Exemplary parameters include:

Nutritional parameters, for example, carbohydrate content, sugar content, saturated fat content, fiber content, omega-3 content, and alcohol content.

Botanical parameter, for example, fruit, vegetable, nut, and animal part

Chemical parameters, for example, texture, taste, and smell.

Parameters may be stored as metadata, and/or as values assigned to respective fields. The values may be defined by a set of possible values (e.g., range, members of a set). Each parameter may be implemented as, for example, a binary value (e.g., yes or no), a set of values from which one value is selected, and/or a continuous and/or discrete range of values from which a specific value is defined (e.g., 1-10 continuous and/or discrete). For example, the fat content of a certain ingredient may be stored a value of a fat content field. In another example, when the ingredient botanically belongs to the berry family, a value of 1 (or other binary representation, such as YES) is stored in an axis (and/or coordinate) corresponding to the berry family. A value of 0 (or other binary representation such as NO) is stored for the berry family axis when the ingredient does not belong to the berry family. In yet another example, when the ingredient includes a known taste molecule denote X of a certain quantity denoted Q, the value Q is stored in association with an axis (and/or coordinate) corresponding to molecule X.

Parameters may include subjective parameters, for example, taste and/or smell. In such cases, the values stored for the parameters may include comparable taste and/or smell values selected from a predefined list, which may be determined, for example, manually by a culinary expert. For example, fruity taste and/or smell. Alternatively or additionally, parameters may include objective values, for example, taste and/or smell parameters determined by the presence of certain chemical structures and/or the presence of certain chemicals known to be present within the ingredients.

Ingredient-substitution dataset 214C stores representations of ingredient-substitutions, each stored as an ingredient substitution data structures. Each ingredient substitution data structure stores at least two ingredients that are defined as substitutes for one another. The ingredients may be stored as pair substitutes, triplet substitutes, or larger numbers. For example, for the ingredient substitution data structure {X,Y, Z}, Y and Z may be substitute for X, X and Z may be substituted for Y, and X and Y may be substituted for Z. Alternatively, the substitute triplet {X,Y,Z} is stored as the substitute pairs {X,Y}, {X,Z}, {Y,Z}. It is noted that the substitutes may be relevant for at least one food-recipe, and not relevant for other food recipes. Examples of substitutes include: {sugar, artificial sweetener}, and {rice, shredded cauliflower}.

The ingredients of the ingredient substitution data structures are stored by ingredient dataset 214B, for example, the ingredients of the ingredient substitution data structures are stored as indications, codes, links, pointers, and/or text entries corresponding to ingredients of ingredient dataset 214B. It is noted that not all substitutions are suitable for every recipe. As described herein, the trained neural network conceptually considers the context of each particular target recipe to suggest the most suitable substitute ingredient for the particular target recipe.

The ingredients of each ingredient substitution data structures may be obtained, for example, by a user manually entering the values, by code instructions that compute the values from data (e.g., obtained by mining datasets over a network), and/or based on an analysis of data collected by crawling code that automatically crawls food-based content stored on network connected nodes.

At 104, a neural network is trained according to the food-recipe data structures, the ingredient data structures, and the ingredient substitution data structures. The neural network is trained to compute coordinates of a target food-recipe point within a multi-dimensional food-recipe space for an input of a target text-based food-recipe. The trained neural network 206B may be stored in storage device 206 and/or data repository 214. The trained neural network is applied, for example, to compute one or more substitute ingredients for a selected ingredient of a target text-based food-recipe as described with reference to act 106, to compute similar recipe(s) as described with reference to act 108, to compute a classifier that classifies target food-recipes as described with reference to act 110, and/or for collaborative filtering as described with reference to act 112.

The output of the neural network (and/or the neural network itself) may be mathematically represented as a function $f$ that operates on a certain inputted food-recipe data structure r, denoted $f(r)$. It is noted that r may be a new target food-recipe data structure not stored in R, and/or a recipe on which the neural network has not been trained.

The function $f$ denotes the value of the hidden layer(s) (i.e., intermediate) and/or output layer (i.e. last) of the neural network, optionally the values of the weights at the respective layer(s). The values of the hidden layer(s) are obtained by forward-feeding the target food-recipe data structure into the trained neural network. The values of the hidden layer(s) and/or output layer(s) correspond to the set of coordinates denoting a point representation of the target food-recipe data structure in the multi-dimensional space.

Optionally, the neural network is trained based on stochastic gradient descent on a distribution of a randomly selected food-recipe data structures from the food-recipe dataset 214A.

Optionally, the coordinates of the point within the multi-dimensional space is computed according to (e.g., corresponding to) values of weights of one or more hidden layer and/or output layers of the neural network. The weights are computed by forward-feeding a food-recipe data structure representation of the target text-based food-recipe into the trained neural network.

An exemplary architecture of the neural network is now described. An input layer of the trained neural network is followed by one or more hidden layers. Each hidden layer is of a dimension determined by a predefined parameter (e.g., manually set by a user, and/or automatically computed by code instructions). Each hidden layer may be connected to adjacent layers by full connectivity. A variable weight is assigned on the connection of each coordinate in each certain hidden layer, to each coordinate in the layer above and the layer below. A top hidden layer is connected to an output layer. The output layer includes a single coordinate for each possible ingredient stored by the ingredient dataset. The output layer may be connected to the topmost hidden layer by full connectivity.

Optionally, a target text-based food-recipe is encoded for feeding into an input layer of the neural network. The target text-based food-recipe may first be converted for storage according to the food-recipe data structure. The encoded target text-based food-recipe includes one or more of the following components, optionally a concatenation of the components:

- A vector representation of the incidence of ingredients appearing in the target text-based food-recipe. The vector is represented within a multi-dimensional space. Optionally, each axes of the multi-dimensional space corresponds to one ingredient stored in the ingredient dataset 214B, and a value along each axes denotes the presence or absence of the corresponding ingredient in the target text-based food-recipe. Each ingredient is identified within the ingredient dataset 214B, and may be stored as a code, link, pointer, identification, and/or text corresponding to the ingredient stored in the ingredient dataset 214B. The vector may be a vector of binary values, where each binary value is indicative of the presence or absence of each possible ingredient as defined by ingredient dataset 214B.
- A vector representation of the amount of the ingredients appearing in the target text-based food-recipe. The vector of quantity for each of the ingredients is represented by a value along an axis indicative of quantity of each respective ingredient in the target text-based food-recipe. The vector is represented within a multi-dimensional space. The vector may be a vector of continuous and/or discrete values, where each value corresponds to one of each possible ingredient as defined by ingredient dataset 214B. Each value is indicative of the amount of the respective ingredient in the food-recipe, in terms of absolute value (e.g., grams) and/or in terms of normalized values (e.g., grams of the ingredient per 100 grams of total weight of the other ingredients). It is noted that the vector of the incidence of ingredients may be combined with the vector of the amount of the ingredients to denote the presence and amount within a single value. Alternatively, the vector of the amount of the ingredients is mapped to the vector of the incidence of ingredients (to reduce the size of the vector by removing the zero amounts for non-present ingredients).
- A weighted average of vectors of values of the parameters of each ingredient appearing in the target text-based food-recipe. The weighting may computed in proportion to the relative ingredient quantities in the food-recipe. The values of the parameters are indicative of coordinates along each axis of a multi-dimensional space. Each axis denotes one parameter.
- A vector representation of the text-based instructions of the target text-based food-recipe. The vector representation of the text-based instructions may be computed according to: a bag-of-words representation computed based on term frequency-inverse document frequency (tf-idf) optionally after filtering out of words lacking culinary information (e.g., "the", "a"), and/or a latent semantic sentence representation for example, encoded by standard language based neural network output.
- A vector representation of the text-based title of the target text-based food-recipe. The vector representation of the text-based title may encoded as described with reference to the encoding of the text-based instructions.

Reference is now made to FIG. 3, which is a flowchart of an exemplary implementation for training the neural network, in accordance with some embodiments of the present invention.

At 302, initial network weights of the neural network are randomly selected. The training of the neural network is based on an iterative adjustment of the weights, as described with reference to acts 304-312.

At 304, a certain food-recipe data structure is selected (optionally randomly) from the food-recipe dataset. In terms of mathematical representation, r is drawn from R.

Optionally, ingredient-substitution data structures associated with the certain food-recipe data structure are selected from dataset 214C, for example, manually defined by an expert and/or automatically computed based on rules that take into account the context of the certain recipe. General substitution ingredient-substitution data structures that store substitutes that are suitable for one recipe but not suitable for another recipe are not necessarily selected. For example, the ingredients {A,B} may be substitutes for a dairy based recipe, but unsuitable for a meat based recipe. The ingredients {B,C} may be substitutes for the meat based recipe, but not for the dairy based recipe. The sets {A,B} and {B,C} may remain as distinct ingredient-substitution data structures rather than being combined into a single set {A,B,C}.

A 306, an adjusted food-recipe data structure is created from the certain food-recipe data structure, by replacing a selected (optionally randomly selected) certain ingredient with a predefined keyword in the set of ingredients and in the instructions of the certain food-recipe data structure. The predefined keyword is a common keyword denoting removal of the certain ingredient. For example, the certain ingredient is removed and replaced with the keyword UNKNOWN.

Alternatively or additionally, the adjusted food-recipe data structure is created from the certain food-recipe data structure, by replacing a selected (optionally randomly selected) certain ingredient with one of the substitute ingredients selected from the associated ingredient-substitution data structures.

At 308, the adjusted food-recipe data structure is fed into the current neural network. An objective loss function is evaluated. The object function is indicative of a statistical distance between set of coordinates of the adjusted food-recipe denoting an adjusted point within the multi-dimensional food-recipe space, and a set of coordinates of the certain food-recipe denoting a certain food-recipe point within the multi-dimensional food-recipe space.

For example, the value of the objective loss unction is higher the further the output is from a vector (i.e., set of coordinates denoting a point) including a value indicative of the presence of the ingredient (e.g., 1) for the axis corresponding to the removed ingredient.

The statistical distance described herein may be measured, for example, based on a squared distance, distance between points in a multi-dimensional Euclidean space, cross entropy, or other standard loss function.

At 310, acts 304-308 are iterated until a stop condition is met. The neural network is trained by computation of the set of weights for layers of the neural network according to iterative minimization of the objective loss function until the stop condition is met. Exemplary stop conditions include a predefined number of iterations, and/or when the objective loss function measured on a validation set (i.e., a set of food-recipe data structures not used for training the neural network) stops to improve according to a requirement.

Optionally, the iterations for training the neural network are performed to minimize the objective loss function over R by stochastic gradient descent. The derivative of the loss unction for r may be back-propagated from the output layer to the input layer, adjusting the weights by an amount determined by a learning rate parameter.

In terms of mathematical representation, the set of computed weights obtained upon terminal of the training iterations is denoted W.

At 312, the trained neural network is provided. The trained neural network may be stored as trained neural network 206B.

The function $f$, on a target food-recipe r, may be defined by feeding a target food-recipe (optionally within one or more removed ingredients) into the trained neural network, and extracting the values of the hidden layer(s) and optionally the output layer.

Referring now back to FIG. 1, at 106, one or more substitutes for one or more ingredients in the text-based food-recipe is computed based on the trained neural network.

Reference is now made to FIG. 4, which is a flowchart of an exemplary method of computing a substitute for one or more ingredients in a text-based food-recipe by the trained neural network, in accordance with some embodiments of the present invention.

It is noted that the described training of the neural network creates a trained neural network for recovering a missing ingredient in a target recipe. Conceptually, for a pair of recipes r1, r2 in the training set that differ by exactly one ingredient, mathematically denoted ing1 in r1 and ing2 in r2, the trained network is unable to distinguish given input r1 (resp. r2) with ingredient ing1 (resp. ing2) withheld, whether the missing ingredient is ing1 or ing2. The output layer assigns the same high score to both ing1 and ing2. Conceptually, the logic also holds (statistically, within a tolerance) when r1 and r2 are just similar (not almost-identical). More generally, given a recipe r with ingredient ing withheld, the neural network is trained to assign a high value to ingredients that are consistent with the recipe, and that may be a substitution for ing.

At 402, a text-based food-recipe is received by computing device 204. The text-based recipe may be, for example, manually entered by a user via user interface 220 of computing device 204 (e.g., via a GUI), a user interface of client terminal 208 (e.g., via a GUI) over network 210, transmitted from server 212 over network 210, and/or from a storage device storing text-based food-recipes.

At 404, the text-based food-recipe is converted into a target food-recipe data structure storing a representation of the text-based food-recipe. The target food-recipe data structure stores a set of ingredients, and instructions for preparation of the respective food-recipe.

The target food-recipe data structure may be encoded for feeding into the input layer of the trained neural network, as described herein with reference to act 104 of FIG. 1.

A 406, a selection of one or more ingredients appearing within the set of ingredients of the target food-recipe data structure is received. The ingredient is selected for substitution.

The selection may be made manually, for example, by a user manually selecting (e.g., clicking, hovering a pointer over, clicking within a box near) on the ingredient via a GUI on client terminal 208.

The selection may be made automatically, for example, by code that analyses the food-recipe according to a user profile. For example, the user profile may include allergy data of the user. The code may analyze the food-recipe to identify ingredients that the user is allergic to. In another example, the user profile may include an indication that the user is vegetarian or vegan. The code may analyze the food-recipe to identify ingredients that are obtained from animal products. In yet another example, the user profile may include personal preferences of the user, including ingredients that user prefers to avoid and/or ingredients that use like. Exemplary user interface parameters include one or more of: dairy free, genetically engineered free, organic, low carb, Eatwell Apple, contains nuts, vegetarian, kosher, gluten free, sugar free, vegan, and Halal. The user may manually define and/or select the user interface parameters. Alternatively or additionally, the user interface parameters are predefined, for example, manually by an expert and/or automatically generated by code instructions (e.g., that crawl web sites to learn what products are considered Kosher). Each ingredient that is associated with each parameter of the user profile is selected for substitution.

At 408, one or more adjusted food-recipe data structures are computed. Each adjusted food-recipe data structure includes a predefined textual code that replaces one of the selected text-based ingredients for substitution, for example, UNKNOWN.

At 410, the trained neural network computes for each of the adjusted food-recipe data structures, coordinates of a respective adjusted point within the multi-dimensional food-recipe space. The respective adjusted point is indicative of the respective adjusted food-recipe data structure.

At 412, for each of the adjusted food-recipe data structures, the value of the coordinates along the axis of the multi-dimensional food-recipe space corresponding to each one of the substitute ingredient indications of the ingredient substitution data structure (of the selected ingredient for substitution) is determined.

For example, when ingredient A is selected for substitution, where ingredients B, C, and D are possible substitutes for A, the value of the coordinates for each of ingredients B, C, and D are determined.

A score may be computed based on the values for the coordinates, for example, a sum, or a statistical (e.g., geometrical) distance from origin. Each one of ingredients B, C, and D is associated with a set of parameters, as described herein. The score is computed for the values along the axis (i.e., coordinates) of the set of parameters of each ingredient B, C, and D. In another example, the score is computed as the statistical distance between the adjusted point representation computed by the neural network for the adjusted food-recipe data structure and a point representing each one of the indications of the substitute ingredients, within the multi-dimensional space.

At 414, one or more substitute ingredients are selected according to a requirement of the value of the coordinate and/or computed score. For example, the requirement denotes selection of the top 1 or 2 substitute ingredients with the highest value and/or score. The requirement may include a minimal value, where substitute ingredients below the minimal value are ignored even if they are in the highest ranking.

At 416, the substitute ingredient (optional text-based version) is provided, for example, transmitted over network 210 to client terminal 208. The substitute ingredient may be presented on a display (e.g. of the client terminal) optionally within the GUI, and/or automatically substituted for the selected ingredients in the text-based food-recipe. The adjusted text-based food-recipe may be transmitted to the client terminal for presentation, and/or stored as an adjusted recipe, for example, a vegan version of a meat recipe, and/or an allergy free version of an allergy prone recipe.

Optionally, all instances of substitute ingredient(s) with the text-based food recipe presented within the GUI are dynamically replaced with the selected ingredient(s).

A pseudocode representation based on the method described with reference to FIG. 4 includes:
Obtain recipe r
For each ingredient ing in L(r)
  Generate recipe r' identical to r, except that ing is removed from r (including from the instructions)
  Compute the value of $f(r')$
  Let SUBS denote the set of ingredients that are generally compatible with ing, based on the set PAIRS.
  For each ing' in SUBS, extract from $f(r')$ the value of the coordinate in the output layer corresponding to ing'. Denote this value by score(ing')
  Sort SUBS based on score (in descending order). Discard options ing' that have an exceedingly low score (defined by a system threshold parameter).
Output the sorted, filtered set SUBS.

Figure 10A:
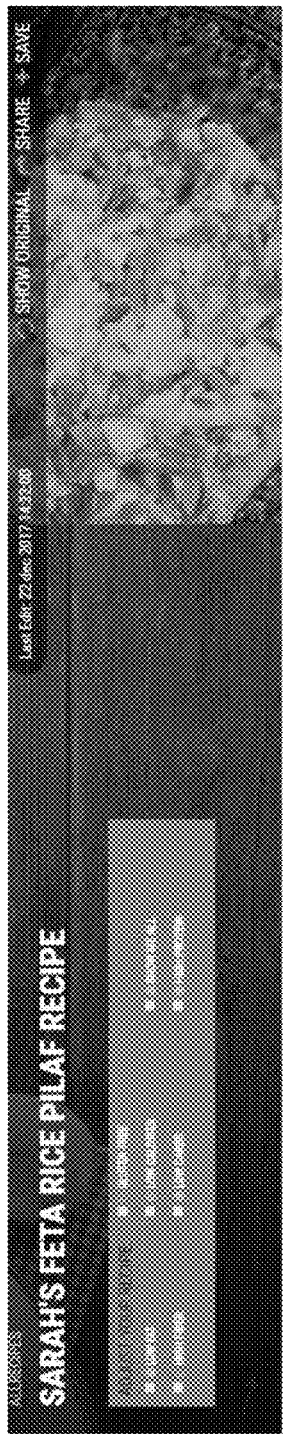
FIGS. 10A, 10B and 10C are images of an exemplary GUI for substituting one or more ingredients in a text-based food-recipe, in accordance with some embodiments of the present invention.
Figure 10B:
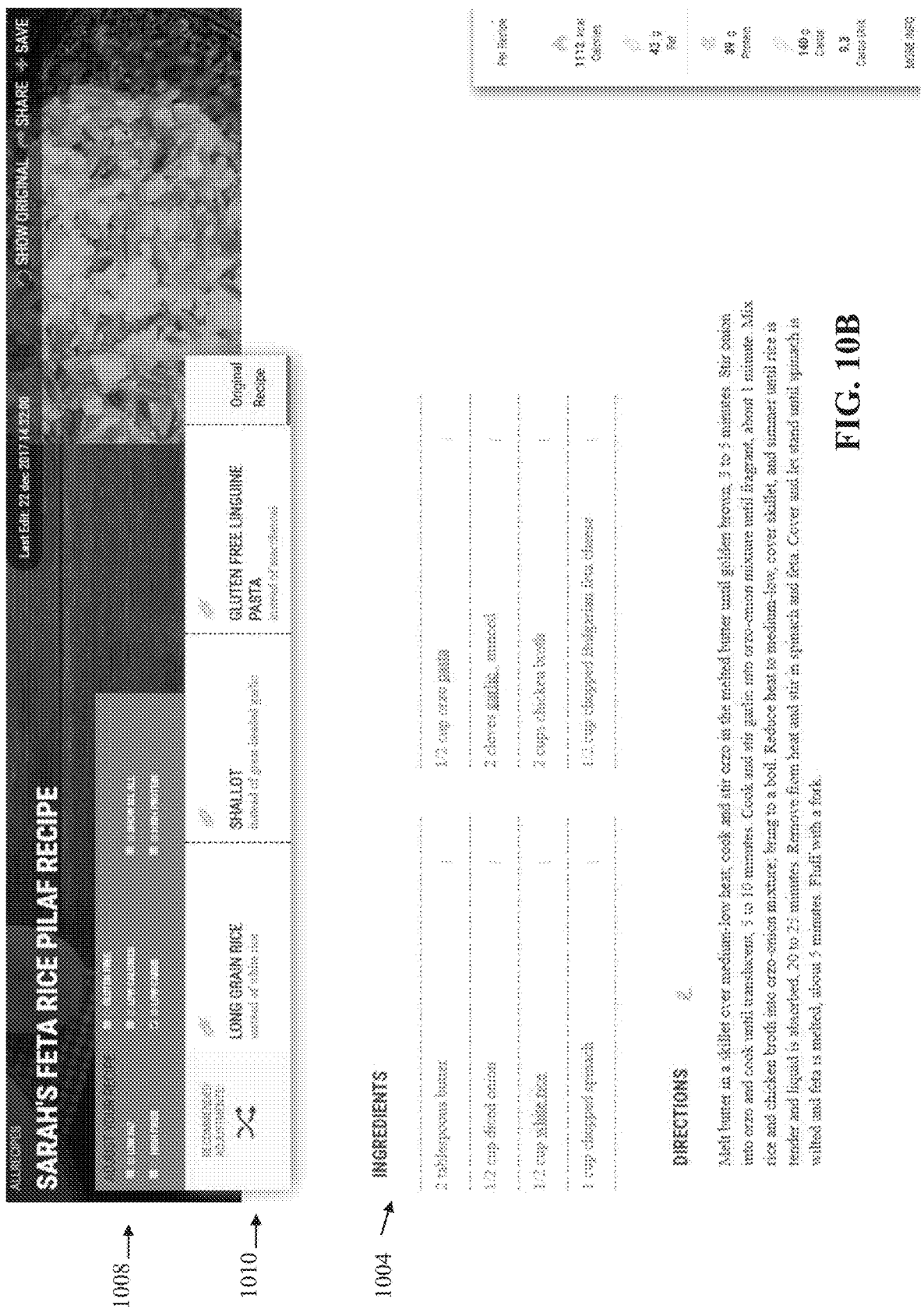
Figure 10C:
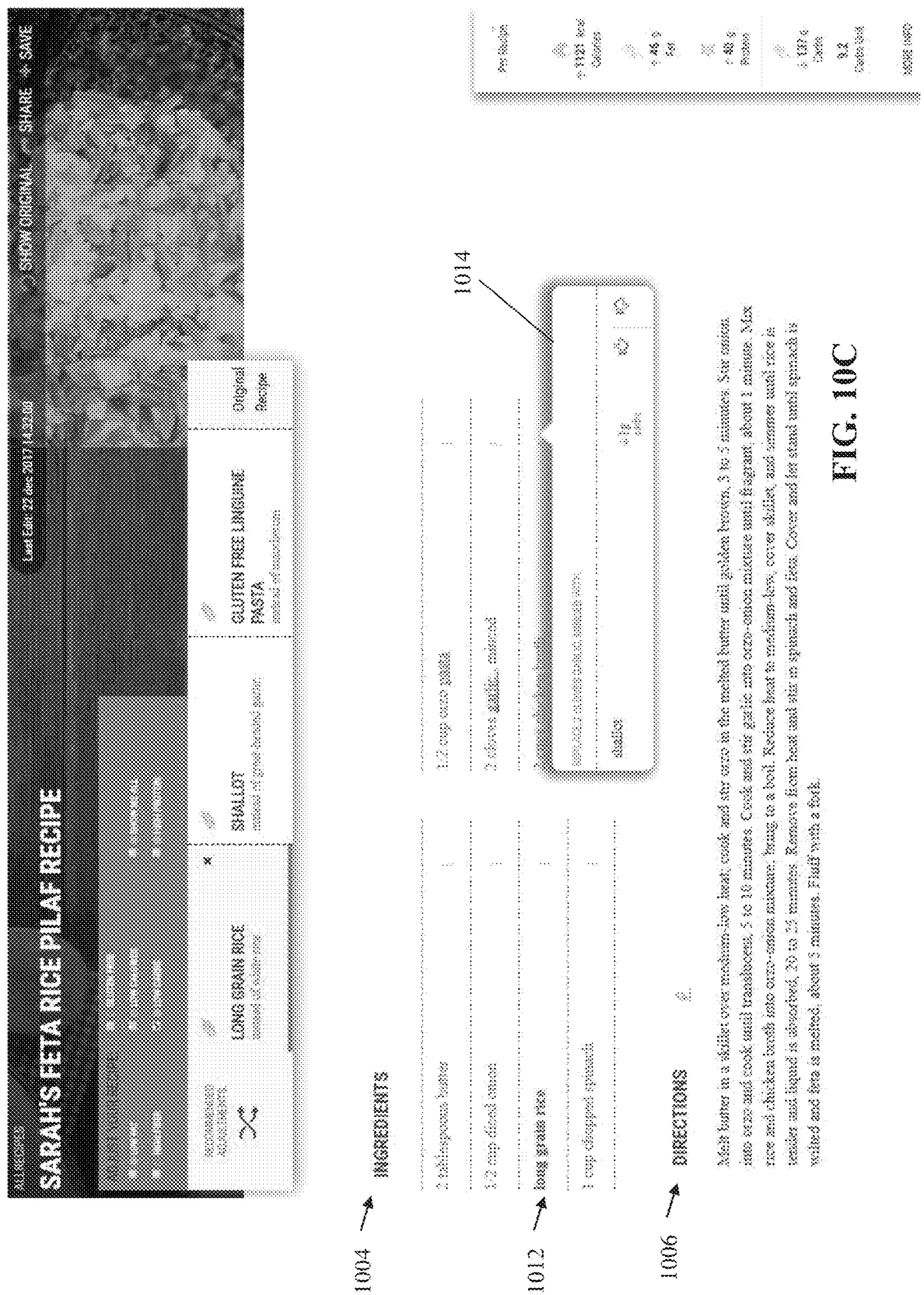

Reference is now made to FIGS. 10A-C, which are images of an exemplary GUI for substituting one or more ingredients in a text-based food-recipe, for example, as described with reference to FIG. 4, in accordance with some embodiments of the present invention.

The GUI of FIG. 10A presents a text-based food-recipe converted into a target food-recipe data structure, for example, as described with reference to act 404 of FIG. 4. The GUI includes a text title 1002, a list of text ingredients and amounts 1004, and text directions 1006, as described herein.

A list of user profile parameters 1008 are available for selection, for example, by clicking, hovering over with the pointer, or clicking within a nearby box. Exemplary parameters include: low fat, high fiber, gluten free, low calories, low carbs, high protein, and an option to select all. Each parameter is associated with one or more of the ingredients 1006 of the text-based food recipe.

The GUI of FIG. 10B depicts an example in which the "Low Carbs" option of the user profile parameters 1008 is selected. Box 1010 presents a list of recommended computed substitute ingredients for each of the relevant text-based ingredients 1004 according to the selected "Low Carbs" option. For example, as shown, long grain rice is recommended as a substitute for white rice, shallot is recommended instead of great-headed garlic, and gluten free linguine pasta is recommended instead of maccheroni. The recommended substitutes are computed, for example, as described with reference to acts 408-416 of FIG. 4.

The GUI of FIG. 10C depicts a substitution of white rice with the selected substitute ingredient long grain rice, within the list of ingredients 1004. It is noted that long grain rice may be substituted within directions 1006. Pop-up box 1014 appears when the word garlic is clicked. Pop-up box 1014 includes recommended ingredients (i.e. Shallot) for substitution with garlic. Selection of shallot within pop-up box 1014 triggers a substitution of the word garlic with shallot within ingredients 1004 and/or directions 1006.

Referring now back to FIG. 1, at 108, one or more similar recipes are identified for a text-based food-recipe based on the trained neural network. In terms of mathematical representation, similarity between two recipes r and r' is computed based on $f(r)$ and $f(r')$.

It is noted that $f$ may denote values (e.g., weights) of the output layer of the neural network, or may denote the values (e.g., weights of a hidden (i.e., intermediate) layer of the trained neural network.

The similarity computation, based on the output of the neural network, takes into account the information available for the recipe (as stored in the datasets), for example, ingredients, nutritional value, chemical structure, texture, and instructions, which were fed as input as part of the described process for training of the neural network.

Reference is now made to FIG. 5, which is a flowchart of an exemplary method of identifying at least one similar recipe for a text-based food-recipe by a trained neural network, in accordance with some embodiments of the present invention.

At 502, a text-based food-recipe is received by computing device 204. The text-based recipe may be, for example, manually entered by a user via user interface 220 of computing device 204 (e.g., via a GUI), a user interface of client terminal 208 (e.g., via a GUI) over network 210, transmitted from server 212 over network 210, and/or from a storage device storing text-based food-recipes.

At 503, one or more similarity parameters may be received by computing device 204. The similarity parameters act as a guide for selection of the recipe that is similar to the text-based food-recipe. The similarity parameters are selected from the axes of the multi-dimensional space, for example, from all available axes or a sub-set of relevant axes. As discussed herein the axes denote parameters of the ingredient, a representation of the instructions, and/or a representation of the title. Exemplary similarity parameters include: taste, texture, total cooking time, and recipes that are baked in an oven The similarity parameters may be manually selected by a user, for example, from a list of commonly selected similarity parameters presented within the GUI on the display (e.g., by clicking on the similarity parameters). Alternatively or additionally, the similarity parameters may be stored within the user profile.

At 504, the text-based food-recipe is converted into a target food-recipe data structure storing a representation of the text-based food-recipe. The target food-recipe data structure stores a set of ingredients, and instructions for preparation of the respective food-recipe.

The target food-recipe data structure may be encoded for feeding into the input layer of the trained neural network, as described herein with reference to act 104 of FIG. 1.

A 506, coordinates of a target point within a multi-dimensional space are computed by the trained neural network for the target food-recipe data structure. The target point is indicative of the target food-recipe data structure.

Optionally, the coordinates are based on weights of hidden layers and/or output layer of the trained neural network.

At 508, the trained neural network computes coordinates of a respective sample point within the multi-dimensional space for each of the sample food-recipe data structures. The sample point is indicative of the respective sample food-recipe data structure.

Optionally, the coordinates are based on weights of hidden layers and/or output layer of the trained neural network.

It is noted that the multi-dimensional representation of the food-recipe outputted by the trained neural network may include coordinates obtained from the hidden layers without necessarily obtaining coordinates from the output layer. Alternatively or additionally, coordinates may be obtained from the output layer.

At 510, a statistical distance between the target point and each respective sample point is computed.

The statistical distance described herein may be measured, for example, based on a squared distance, distance between points in a multi-dimensional Euclidean space, cross entropy, or a standard loss function.

At 512, one or more sample food-recipe data structures are selected according to a requirement of the statistical distance.

Optionally, the requirement is based on the selected similarity parameter(s). The similarity parameter(s) may define the axes along which the points of the sample food-recipe data structures are closest to the point of the target food-recipe data structure. For example, when computing the statistical distance, a significantly larger weight is assigned to the axes denoting the selected similarity parameter(s). The sample food-recipes that are statistically closest to the target food-recipe data structure along the axes representing the similarity parameter(s) are selected. In this manner, recipes most similar to the target recipe in terms of the similarity parameter, in view of the context, are selected, for example, recipes with similar taste and/or texture.

Alternatively or additionally, the requirement of the statistical distance is a preselected value indicative of a minimum similarity between the target food-recipe and each of the selected sample food-recipes. For example, the closest predefined number of sample food-recipes are selected (e.g., the closest one, two, five, or other numbers). Optionally, the requirement includes a floor and/or ceiling of the statistical distance. The floor may indicate at least a defined minimal value for the statistical distance, to ensure that the selected sample food-recipe is not exactly the same as the target recipe but differing in one small detail, but rather is a different recipe that is similar. The ceiling may indicate a maximal value for the statistical distance, to ensure that the selected sample food-recipe is at least somewhat similar to the target recipe and not an unrelated recipe that is selected for example because it falls into the top 5 selected recipes.

At 514, the selected similar food-recipe(s) is provided, for example, transmitted over network 210 to client terminal 208. The selected similar food-recipe(s) may be presented on a display (e.g. of the client terminal), and/or automatically substituted for the selected ingredients in the text-based food-recipe. The selected similar food-recipe(s) may be transmitted to the client terminal for presentation, and/or stored as a selected similar food-recipe(s).

A pseudocode representation based on the method described with reference to FIG. 5 includes:

Precomputation: For all recipes r in R, compute $f(r)$ and store the result set of vectors in a data structure supporting standard geometric near-neighbor searching in the space defined by the dimension of $f$ and a standard similarity or distance function (for example, cosine similarity). The values $f(r)$ may be normalized (e.g. in Euclidean norm). It is noted that $f$ may denote values (e.g., weights) of the output layer of the neural network, or may denote the values (e.g., weights of a hidden (i.e., intermediate) layer of the trained neural network.

Serving a recipe (query): Given a recipe r, find the m most similar recipes in R, the precomputed near-neighbor supporting data structure above. The number m is a system parameter. The output recipes that are not close enough to r (using a system threshold parameter to define the limit) are discarded.

Optionally, features of the method for identifying at least one substitute ingredient described with reference to FIG. 4 may be implemented with features of the method for identifying at least one similar food-recipe described with reference to FIG. 5, to create a method for identifying at least one substitute ingredient from the identified similar food-recipe(s).

The target recipe is received and encoded as described with reference to act 402 (or 502) and 404 (or 504). According to act 406, one or more ingredients are selected for substitution. According to act 506, coordinates of the target point within the multi-dimensional space are computed by the trained neural network for the target food-recipe data structure. According to 508, the trained neural network computes coordinates of a respective sample point within the multi-dimensional space for each of the sample food-recipe data structures. According to 510, a statistical distance between the target point and each respective sample point is computed. The requirement for selecting similar food-recipes described with reference to act 512 includes selection the sample food-recipe data structures that have the lowest statistical distance to the target food-recipe, and that includes at least one ingredient which is defined as a substitute for respective selected ingredients (i.e., as stored by the ingredient-substitution dataset 214C). At 418, an indication of the ingredient for substitution for each selected ingredient of the target food-recipe data structure is provided.

Referring now back to FIG. 1, at 110, a classifier for classification of a text-based food-recipe is computed based on output of the trained neural network.

Reference is now made to FIG. 6, which is a flowchart of an exemplary method of computing a classifier for classification of a text-based food-recipe based on output of the neural network, on accordance with some embodiments of the present invention.

At 602, an indication of a classification type is received for each sample food-recipe data structure. Exemplary classification types include: type of ethnic food, country of origin of the food, quick to prepare food, gourmet food, and categorical name of the food.

The classification types may be stored, for example, as a tag, metadata, and/or pointer to a set of predefined classification types.

The classification types may be obtained, for example, by a user manually entering the classification in association with each text-based food-recipe, and/or by automatic code instructions that automatically identify the classification for text-based food-recipes, for example, by code instructions that reach a web page of Chinese Food-recipes, and automatically assign the classification CHINESE FOOD to all the recipes on the web page.

At 604, the trained neural network computes coordinates of a respective sample point within a multi-dimensional space for each of the sample food-recipe data structures. Feature vector(s) based on the computed coordinates are used for training the statistical classifier.

It is noted that the multi-dimensional representation of the food-recipe outputted by the trained neural network may include coordinates obtained from one or more hidden layers (i.e., intermediate layers) and/or the output layer (i.e., the last layer), for example, the weights of the hidden and/or output layers.

The values of the hidden and/or output layers may be stored as a set of features, for example, a feature vector, for training the classifier.

A 606, a statistical classifier is trained for computing a classification type for a target food-recipe data structure storing a representation of a text-based food-recipe, according to the sample points and associated classification types.

The statistical classifier may be trained as a binary classifier (e.g., outputs yes/no for a target food-recipe data structure and associated classification type), or a multi-class classifier (e.g., outputs the classification type for an input of the target food-recipe data structure).

The statistical classifier is trained based on supervised methods. Exemplary statistical classifiers include: kernel support vector machine (SVM), neural network(s), linear regression, decision tree, and nearest neighbor classifier(s). One or more classifiers may be trained, for example, cascade classifiers.

At 608, the statistical classifier is provided, for example, stored on a data storage device (e.g., data repository 214, server(s) 212, and/or storage device(s) 218. The statistical classifier may be implemented, for example, by a web site that hosts text-based food-recipes, for classifying a new (and/or existing) food-recipes into appropriate classification categories.

The statistical classifier may be implemented for example, to answer the following questions: Is the target recipe r a muffin? Is the target recipe r a Korean dish? Should I substitute a certain ingredient in the recipe by another ingredient? Alternatively or additionally, the classifier may output the classification type for the target recipe, for example, as muffin and/or Korean dish. The classifier may output an indication of appropriateness of the substitution of the ingredients, for example, a binary value indication of yes/no, or a value on a scale indicating a degree of appropriateness.

Optionally, features of the method for identifying at least one substitute ingredient described with reference to FIG. 4 may be implemented based on features of the method for training the statistical classifier described with reference to FIG. 6, to create a method for training a classifier to output an indication of appropriateness of a substitution of one or more ingredients in a target food-recipe.

According to 406, a selection of one or more ingredients is made for substitution for each of multiple sample food-recipe data structures stored in food-recipe dataset 214A. Optionally, every ingredient that has a substitute is automatically selected. According to 602, the indication of the classification type is defined for each sample food-recipe data structures. Alternatively or additionally to the previously described indication, the indication includes a score indicative of appropriateness of substituting the respective selected ingredient with one (or more, optionally each one) of the substitute ingredient(s) stored in the ingredient substitution data structure that includes the selected ingredient. According to 604, the trained neural network computes coordinates of the respective sample point within a multi-dimensional space for each of the sample food-recipe data structures. According to 604, the statistical classifier is trained for computing an appropriateness score for substituting a target ingredient with another ingredient for the target food-recipe data structure according to the sample points, the score indicative of appropriateness of substitution, the selected ingredient(s), and the substitute ingredient(s). According to 608, the statistical classifier is provided.

Referring now back to FIG. 1, at 112, the multi-dimensional representation of the target food-recipe data structure computed by the trained neural network is provided as input to code instructions for performing collaborative filtering. The collaborative filtering code, given past information of a population of users' preference information for a space of objects represented by a vector (i.e., $f(r)$), outputs recommendations for objects for a user (based on the user's past preference information). Collaborative filtering code designed for suggesting for example, products, movies, and/or ads, may be adapted to the food-recipe domain, for computing food-recipe preferences for users based on input from the trained neural network. It is noted that the multi-dimensional representation of the food-recipe outputted by the trained neural network may include coordinates obtained from the hidden layers without necessarily obtaining coordinates from the output layer. Alternatively or additionally, coordinates are obtained from the output layer.

It is noted that acts 106-112 of FIG. 1 represent not necessarily limiting examples of applications of the trained neural network of act 104. Additional exemplary applications include:

Adding an additional ingredient to ingredients of a text-based food-recipe without significantly affecting a factor(s) of the text-based food-recipe, for example, without significantly affect taste, and/or texture. A statistical distance between the original text-based food-recipe (i.e., without the additional ingredient) and the adjusted text-based food-recipe (i.e., with the additional ingredient) is computed. The statistical distance is evaluated according to a requirement (e.g., threshold, range) relative to one or more axes representing the factor(s), for example, one or more axes representing taste. When the statistical distance relative to the one or more axes of the factor(s) is within the requirement (e.g., below the threshold), the additional ingredient represents no statistically significant change to the taste and/or threshold. When the statistical distance relative to the one or more axes of the factor(s) is outside the requirement (e.g., above the threshold), the additional ingredient represents a statistically significant alteration to the taste and/or threshold.

Removing an existing ingredient of a text-based food-recipe without significantly affecting a factor(s) of the text-based food-recipe, for example, without significantly affect taste, and/or texture. A statistical distance between the original text-based food-recipe (i.e., with all ingredients) and the adjusted text-based food-recipe (i.e., without the additional ingredient) is computed. The statistical distance is evaluated according to a requirement (e.g., threshold, range) relative to one or more axes representing the factor(s), for example, one or more axes representing taste. When the statistical distance relative to the one or more axes of the factor(s) is within the requirement (e.g., below the threshold), the removal of the ingredient represents no statistically significant change to the taste and/or threshold. When the statistical distance relative to the one or more axes of the factor(s) is outside the requirement (e.g., above the threshold), the removal of the ingredient represents a statistically significant alteration to the taste and/or threshold.

Ingredients may be matched to one another in terms of a factor, for example, a taste and/or texture, not necessarily in the context of a certain recipe. The ingredients may be fed into the neural network (after formatting into the food-recipe data structure with no data for the instructions and title) for computation of the multi-dimensional representation. The trained neural network computes the multi-dimensional representation for the two ingredients, optionally generating two respective points in a multi-dimensional space. The statistical distance between the two points is computed and analyzed according a requirement (e.g., threshold, range) relative to one or more axes representing the factor(s), for example, one or more axes representing taste and/or texture. When the statistical distance relative to the one or more axes of the factor(s) is within the requirement (e.g., below the threshold), the two ingredients represents a similarly of taste and/or threshold. When the statistical distance relative to the one or more axes of the factor(s) is outside the requirement (e.g., above the threshold), the two ingredients represents a statistically significant alteration to the taste and/or threshold.

Figure 7:
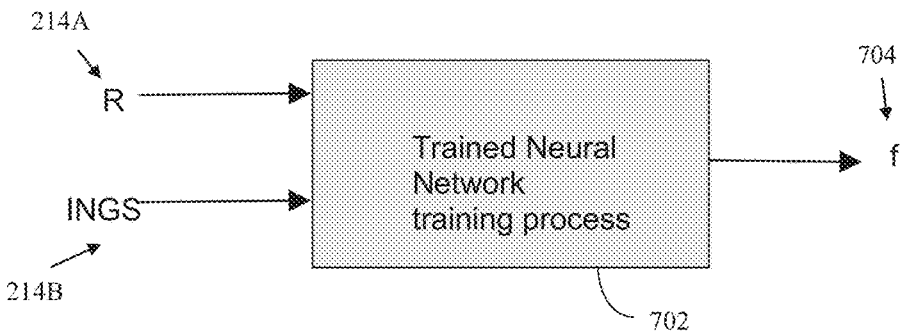
FIG. 7 is a dataflow diagram depicting a process of training a neural network according to food-recipe dataset R and ingredient dataset, for computing a multi-dimensional representation $f$ of a target food-recipe data structure, in accordance with some embodiments of the present invention.

Reference is now made to FIG. 7, which is a dataflow diagram depicting a process of training a neural network 702 according to food-recipe dataset R 214A and ingredient dataset 214B, for computing a multi-dimensional representation $f$ 704 (e.g., coordinates of a point within a multi-dimensional space) of a target food-recipe data structure, in accordance with some embodiments of the present invention. The process of training the neural network 702 is described with reference to act 104 of FIG. 1 and/or FIG. 3.

Figure 8:
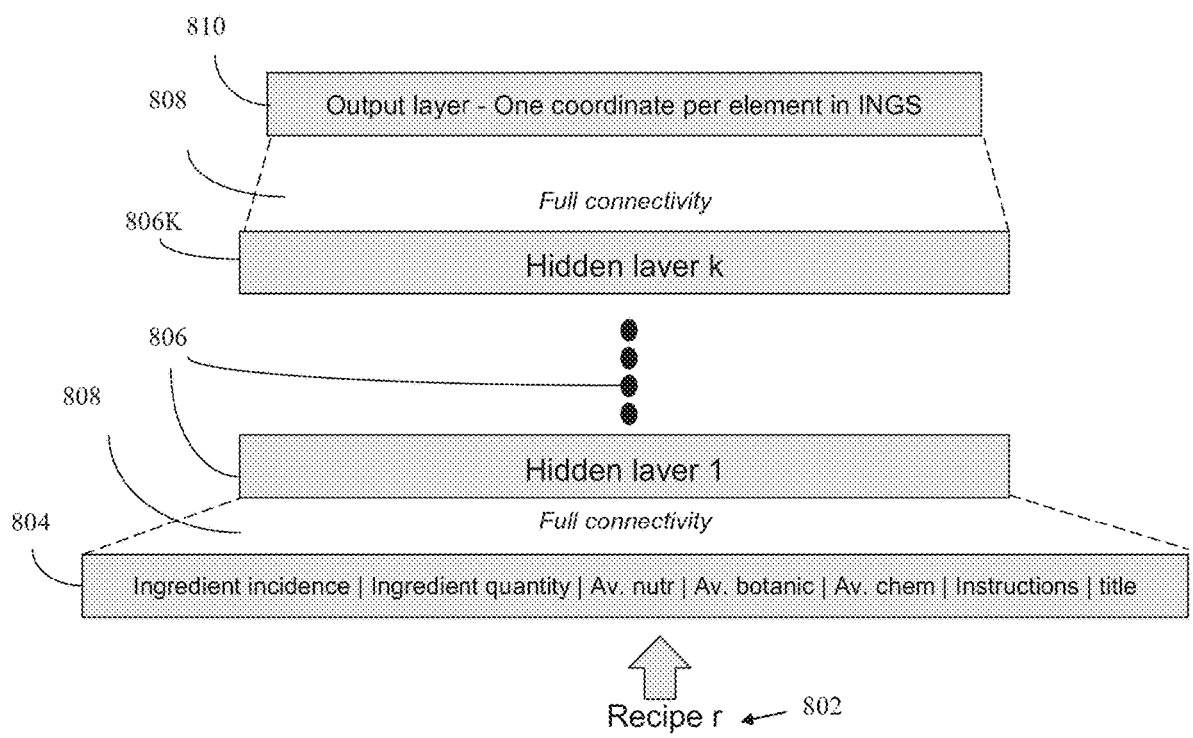
FIG. 8 is a schematic of an exemplary architecture of the trained neural network, in accordance with some embodiments of the present invention.

Reference is now made to FIG. 8, which is a schematic of an exemplary architecture of the trained neural network, in accordance with some embodiments of the present invention. A target recipe 802 is provided as input into an input layer 804 of the trained neural network. Input layer 804 is followed by one or more hidden layers 806. Each hidden layer 806 is of a dimension determined by a predefined parameter (e.g., manually set by a user, and/or automatically computed by code instructions). Each hidden layer 806 may be connected to adjacent layers by full connectivity 808. A variable weight is assigned on the connection of each coordinate in each certain hidden layer, to each coordinate in the layer above and the layer below. A top hidden layer 806K is connected to an output layer 810. The output layer 810 includes a single coordinate for each possible ingredient stored by the ingredient dataset. The output layer may be connected to the topmost hidden layer by full connectivity.

Figure 9:
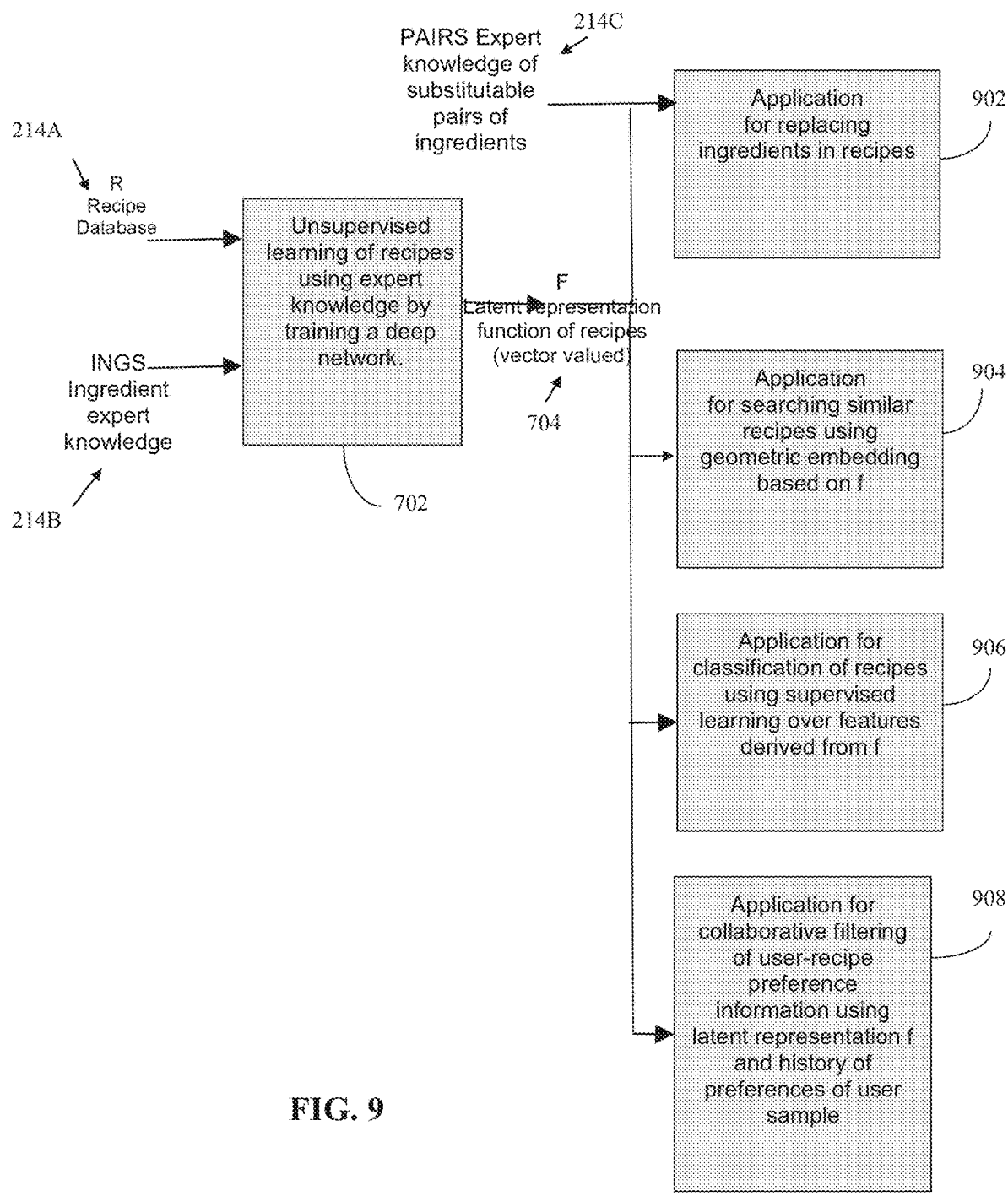
FIG. 9 is a dataflow diagram depicting exemplary applications based on the multi-dimensional representation of a target food-recipe computed by a neural network, in accordance with some embodiments of the present invention.

Reference is now made to FIG. 9, which is a dataflow diagram depicting exemplary applications based on the multi-dimensional representation of a target food-recipe computed by a neural network, in accordance with some embodiments of the present invention. Neural network 702 is trained according to food-recipe dataset R 214A and ingredient dataset 214B, for computing multi-dimensional representation $f$ 704 (e.g., coordinates of a point within a multi-dimensional space) of a target food-recipe data structure, as described herein. Exemplary applications 902-908 include:

Application for replacing ingredients in recipes 902, for example as described with reference to FIG. 4.

Application for searching for similar recipes using geometric embedding based on $f$, for example as described with reference to FIG. 5.

Application for classification of recipes using supervised learning over features derived from $f$, for example as described with reference to FIG. 6.

Application for collaborative filtering of user-recipe preference information using latent representation $f$ and history of preferences of user sample, for example as described with reference to act 112 of FIG. 1.

Ingredient-substitute dataset 214C is accessed for execution of applications 902-908, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing devices will be developed and the scope of the term computing device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of computing by a computer system in communication with an ingredient-substitution dataset, with a trained neural network, and with a client terminal, via a network, a substitute for at least one ingredient in a text-based food-recipe, comprising:
    receiving a target text-based food-recipe including a set of text-based instructions for preparation of a certain food-recipe according to a set of text-based ingredients;
    converting the target text-based food-recipe to a target food-recipe data structure storing an indication of the set of text-based ingredients, and the set of text-based instructions;
    receiving from the client terminal via a GUI presenting the target text-based food-recipe on a display, a selection of at least one text-based ingredient of the set of text-based ingredients for substitution;
    accessing at least one ingredient substitution data structure each storing at least one ingredient indication that is a substitutes for one of the selected at least one text-based ingredient;
    computing at least one adjusted food-recipe data structure for the target food-recipe data structure, each adjusted food-recipe data structure includes a predefined textual code that replaces one of the selected text-based ingredients for substitution;
    computing for each of the adjusted food-recipe data structures, by the trained neural network, coordinates of a respective adjusted point within a multi-dimensional food-recipe space;
    determining, for each of the adjusted food-recipe data structures, the value of the coordinates of the respective adjusted point within the multi-dimensional food-recipe space corresponding to each one of the substitute ingredient indications of the ingredient substitution data structure corresponding to the selected text-based ingredient for substitution;
    selecting, for each of the selected text-based ingredients for substitution, at least one substitute ingredient indication from the corresponding ingredient substitution data structure according to a requirement of the value of the coordinate;
    presenting within the GUI on the display of the client terminal in association with the text-based target food-recipe, for each of the selected text-based ingredients for substitution, the selected at least one substitute ingredient indication; and
    encoding the target text-based food-recipe for converting into the target food-recipe data structure for feeding into an input layer of the neural network, the encoded converted target food-recipe data structure include at least one of:
        (i) a vector representation of a plurality of ingredients appearing in the target text-based food-recipe identified within the ingredient dataset,
        (ii) a vector of quantity for each of the plurality of ingredients appearing in the target text-based food-recipe,
        (iii) a weighted average of vectors of values of a plurality of parameters of each ingredient appearing in the target text-based food-recipe, and
        (iv) a vector representation of the text-based instructions of the target text-based food-recipe, and
            (v) a vector representation of the text-based title of the target text-based food-recipe;
    wherein:
        (i) the vector representation of the plurality of ingredients is represented within a multi-dimensional ingredient space, wherein each axes of the multi-dimensional ingredient space corresponds to one ingredient stored in the ingredient dataset, and a value along each axes denotes the presence or absence of the corresponding ingredient in the target text-based food-recipe,
        (ii) the vector of quantity for each of the plurality of ingredients is represented by a value along an axis indicative of quantity of each respective ingredient in the target text-based food-recipe,
        (iii) the values of the plural of parameters are indicative of coordinates along each of a plurality of axes of a multi-dimensional ingredient space, each axis denoting one parameter of the plurality of parameters,
        (iv) the vector representation of the text-based instructions is computed according to at least one of: a bag-of-words representation computed based on term frequency-inverse document frequency (tf-idf), and a latent semantic sentence representation encoded by standard language based neural network output, and
        (v) the vector representation of the text-based title is computed according to at least one of: a bag-of-words representation computed based on term frequency-inverse document frequency (tf-idf), and a latent semantic sentence representation encoded by standard language based neural network output.

2. The method according to claim 1, further comprising:
    receiving from the client terminal via a GUI presenting the target text-based food-recipe on a display, at least one parameter of a personal user profile, wherein each parameter of the personal user profile is associated with at least one ingredient indication,
    wherein the selection of at least one text-based ingredient of the set of text-based ingredients for substitution is performed according to the indication of ingredients that satisfy the personal user profile.

3. The method according to claim 2, wherein one or more parameters of the user profile are selected from the group comprising: ingredients disliked, ingredients preferred, allergies, dairy free, genetically engineered free, organic, low carb, Eatwell Apple, contains nuts, vegetarian, Kosher, gluten free, sugar free, vegan, Halal, and combinations of the aforementioned.

4. The method according to claim 1, wherein the at least one ingredient of the set of ingredients of the target food-recipe data structure is selected for substitution by at least one of clicking with a pointer, hovering a pointer over the at least one text-based ingredient, and clicking an icon associated with the at least one text-based ingredient.

5. The method according to claim 1, and wherein the selected at least one text-based ingredient for substitution is automatically substituted within the GUI with the selected at least one substitute ingredient indication.

6. The method according to claim 1, wherein the requirement comprises selecting a predefined number of substitute ingredient indications according to the highest coordinate values and above a preselected floor-value.

7. The method according to claim 1, wherein the text-based food-recipe is converted into the food-recipe data structure by parsing and formatting the text-based food-recipe, wherein the text-based set of ingredient indications are stored according to predefined identifiers, each ingredient indication of the set of ingredient indications is stored by the food-recipe data structure in association with a respective quantity of the respective ingredient of the respective text-based food-recipe, and the text-based instructions are stored as simple text.

8. The method according to claim 1, wherein values of parameters of each ingredient indication define corresponding values of the coordinates along each of a plurality of axes of a multi-dimensional ingredient space, the parameters include at least one of: a plurality of nutritional parameters, at least one botanical parameter, and a plurality of chemical parameters.

9. The method according to claim 8, wherein the plurality of nutritional parameters are selected from the group comprising: carbohydrate content, sugar content, saturated fat content, fiber content, omega-3 content, and alcohol content, wherein the at least one botanical parameter is selected from the group comprising: fruit, vegetable, nut, and animal part, and the plurality of chemical parameters are selected from the group comprising: texture, comparable taste, and comparable smell.

10. The method according to claim 1, wherein the coordinates of the adjusted point within the multi-dimensional food-recipe space is computed according to values of weights of at least one hidden layer within the neural network, obtained by forward-feeding the food-recipe data structure into the trained neural network.

11. A computer implemented method of generating a neural network for computation of a multi-dimensional representation of a text-based food-recipe, comprising:
 receiving by a computer system in communication with:
  a food-recipe dataset, an ingredient dataset, and an ingredient-substitution dataset:
   a plurality of food-recipe data structures each storing a set of ingredient indications and text of instructions for preparation,
   a plurality of ingredient data structures each storing values of parameters of a respective ingredient indication of the set of ingredient indications, represented as an ingredient point in a multi-dimensional ingredient space,
   a plurality of ingredient substitution data structures each storing at least two indications of ingredients stored by the ingredient dataset that are substitutes for at least one ingredient indication stored in at least one food-recipe data structure, and
 training a neural network according to the plurality of food-recipe data structures, the plurality of ingredient data structures, and the plurality of ingredient substitution data structures, wherein initial network weights of the neural network are randomly selected and adjusted according to a plurality of iterations, and comprising for each iteration:
  randomly selecting a certain food-recipe data structure,
  creating an adjusted food-recipe data-structure from the certain food-recipe data-structure by replacing a randomly selected certain ingredient indication with a predefined keyword in the set of ingredients and in the instructions of the certain food-recipe,
  feeding the adjusted food-recipe data-structure into the current neural network, and computing an objective loss function indicative of a statistical distance between a set of coordinates of the adjusted food-recipe data structure denoting an adjusted point within a multi-dimensional food-recipe space, and a set of coordinates of the certain food-recipe data-structure denoting a certain food-recipe point within the multi-dimensional food-recipe space;
 wherein the neural network is trained by computation of a set of weights for layers of the neural network according to iterative minimization of the objective loss function until a stop condition is met;
 wherein the trained neural network computes coordinates of a food-recipe point within a multi-dimensional food-recipe space for an input of a target text-based food-recipe received by the computer system from a client terminal over a network.

12. The method according to claim 11, wherein an input layer of the trained neural network is followed by at least one hidden layer, wherein each at least one hidden layer is of a dimension determined by a predefined parameter, each at least one hidden layer is connected to adjacent layers by full connectivity, wherein a variable weight is assigned on the connection of each coordinate in each certain hidden layer, to each coordinate in the layer above and the layer below each certain layer, wherein a top hidden layer is connected to an output layer, wherein the output layer includes a single coordinate for each possible ingredient stored by the ingredient dataset, wherein the output layer is connected to the topmost hidden layer by full connectivity.

13. The method according to claim 11, wherein at least one of the plurality of ingredient-substitution data structures is computed based on an analysis of data collected by crawling code that automatically crawls food-based content stored on network connected nodes.

14. The method according to claim 11, wherein the neural network is trained based on stochastic gradient descent on a distribution of a randomly selected plurality of food-recipe data structures from the food-recipe dataset.

* * * * *